US012686212B2

(12) United States Patent
Nakamoto et al.

(10) Patent No.: US 12,686,212 B2
(45) Date of Patent: Jul. 21, 2026

(54) INK CONTAINER AND RECORDING APPARATUS

(71) Applicant: CANON KABUSHIKI KAISHA, Tokyo (JP)

(72) Inventors: Mari Nakamoto, Kanagawa (JP); Naozumi Nabeshima, Tokyo (JP); Shoki Wakatsuki, Tokyo (JP); Taketsugu Murakami, Kanagawa (JP); Katsunori Oya, Kanagawa (JP); Akira Shiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 18/794,798

(22) Filed: Aug. 5, 2024

(65) Prior Publication Data

US 2025/0050651 A1 Feb. 13, 2025

(30) Foreign Application Priority Data

Aug. 7, 2023 (JP) ................................ 2023-128241

(51) Int. Cl.
*B41J 2/175* (2006.01)

(52) U.S. Cl.
CPC ....... *B41J 2/17553* (2013.01); *B41J 2/17513* (2013.01); *B41J 2/17523* (2013.01); *B41J 2002/17516* (2013.01)

(58) Field of Classification Search
CPC ................ B41J 2/17553; B41J 2/17513; B41J 2/17523; B41J 2002/17516; B41J 2/1753; B41J 2/17503; B41J 2/1752
See application file for complete search history.

(56) References Cited

U.S. PATENT DOCUMENTS

| | | | | |
|---|---|---|---|---|
| 2002/0122103 | A1 | 9/2002 | Yamamoto | |
| 2008/0037910 | A1 | 2/2008 | Matsumoto | |
| 2012/0098901 | A1 | 4/2012 | Asauchi | |
| 2014/0362148 | A1 | 12/2014 | Ishizawa | |
| 2015/0077483 | A1 | 3/2015 | Nagashima | |
| 2018/0104955 | A1 | 4/2018 | Kawate | |
| 2018/0215161 | A1 | 8/2018 | Koizumi | |
| 2019/0184710 | A1* | 6/2019 | Nagashima | B41J 2/17553 |
| 2020/0122471 | A1* | 4/2020 | Hirata | B41J 2/17553 |

FOREIGN PATENT DOCUMENTS

| | | | |
|---|---|---|---|
| JP | 2001328272 | A | 11/2001 |
| JP | 2019107823 | A | 7/2019 |
| JP | 2021014091 | A | 2/2021 |

* cited by examiner

*Primary Examiner* — Lisa Solomon

(74) *Attorney, Agent, or Firm* — Canon U.S.A., Inc. IP Division

(57) ABSTRACT

Provided are an ink container in which blockage of a flow path in an ink storage portion is suppressed and a recording apparatus using the ink container. The ink container includes an ink storage portion that has flexibility and that is configured to store ink in an interior thereof and an ink supply portion that is configured to supply the ink stored in the ink storage portion to outside. A ridge portion is provided at a certain position on a surface of the ink storage portion in such a manner as to cross an imaginary line obtained by extending a central axis of the ink supply portion.

8 Claims, 29 Drawing Sheets

INK CONTAINER AND RECORDING APPARATUS

BACKGROUND OF THE DISCLOSURE

Field of the Disclosure

The present disclosure relates to an ink container and a recording apparatus.

Description of the Related Art

There is known an ink container (an ink pack) in which a liquid (particularly, ink) to be supplied to a recording apparatus, such as an inkjet printer, is contained in a flexible bag (see, for example, Japanese Patent Laid-Open No. 2019-107823 or the like).

Japanese Patent Laid-Open No. 2019-107823 discloses a configuration in which an ink supply member is attached to one end portion of a bag. In the configuration, an ink outlet tube is disposed at a center portion in the bag and connected to an end portion of a spacer member extending toward another end portion of the bag, and ink that is present in an inaccessible region of the bag is discharged to the ink supply member through an outlet port of the ink outlet tube. According to Japanese Patent Laid-Open No. 2019-107823, the spacer member suppresses the position of an end of an ink outlet pipe from shifting, and even when the bag contracts as a result of a liquid being consumed, the bag is suppressed from becoming deformed around the liquid outlet pipe and the spacer member, thereby reducing the probability of blockage of the flow path of the liquid. In addition, it describes that radial guide flow paths for guiding the ink toward the spacer member are formed in an ink storage portion, so that the flow of the ink in the bag can be suppressed from being obstructed.

SUMMARY OF THE DISCLOSURE

An ink container according to an aspect of the present disclosure includes an ink storage portion that has flexibility and that is configured to store ink in an interior thereof, the ink storage portion including (1) a first surface, (2) a second surface that is opposite to the first surface and that has first and second sides shared with the first surface, (3) a first gusset surface connecting the first surface and the second surface to each other, and (4) a second gusset surface that is opposite to the first gusset surface and that connects the first surface and the second surface to each other and an ink supply portion that is provided at the first side of the ink storage portion and that is configured to supply the ink stored in the ink storage portion to outside. A ridge portion is provided at the first surface of the ink storage portion so as to cross an imaginary line obtained by extending a central axis of the ink supply portion. When a distance from a first end portion of the ink supply portion, the first end portion facing the interior of the ink storage portion, to an intersection point of the ridge portion and the imaginary line is denoted by $D_1$ [mm] and a thickness of the first end portion of the ink supply portion is denoted by $T_1$ [mm], a ratio $D_1/T_1$ is 5/8 or more and 40/8 or less. The first gusset surface and the second gusset surface each include a folded portion that is provided so as to be folded toward the interior of the ink storage portion. A shortest distance from each one of two end portions of the ridge portion to an apex of the folded portion of the first gusset surface or the second gusset surface closer to the one of the two ends is 25 mm or less.

Further features of the present disclosure will become apparent from the following description of exemplary embodiments with reference to the attached drawings.

DESCRIPTION OF THE EMBODIMENTS

From the standpoint of environmental consideration, the inventors of the present disclosure have conceived that it is necessary to reduce the amount of plastic used in an ink container. As one approach, instead of a configuration in which the spacer member is provided in order to position the outlet port of the ink outlet tube at a center portion of the bag as in Japanese Patent Laid-Open No. 2019-107823, a configuration has been examined in which an ink outlet port is provided in the vicinity of an end portion of the bag, that is, a configuration in which the ink is supplied to the outside from another end portion (end portion facing the inside of the bag) of an ink supply member provided at one end portion of the bag.

However, it was found that such a configuration of the ink container causes another new problem. More specifically, a problem in which a passage (flow path) through which the ink flows toward the ink supply member becomes blocked due to the ink storage portion becoming deformed as the ink stored in the ink storage portion is consumed may occur in the absence of an ink outlet tube or a spacer member such as that described in Japanese Patent Laid-Open No. 2019-107823.

The present disclosure provides an ink container in which blockage of a flow path in an ink storage portion is suppressed and a recording apparatus using the ink container.

An ink container (an ink pack, an ink cartridge) and a recording apparatus according to embodiments of the present disclosure will be described in detail below with reference to the drawings. Note that the following embodiments are exemplary embodiments of the present disclosure, and the present disclosure is not limited to these configurations. In addition, the contents described in the embodiments can be partially combined.

(I) Ink Container

Figure 1:
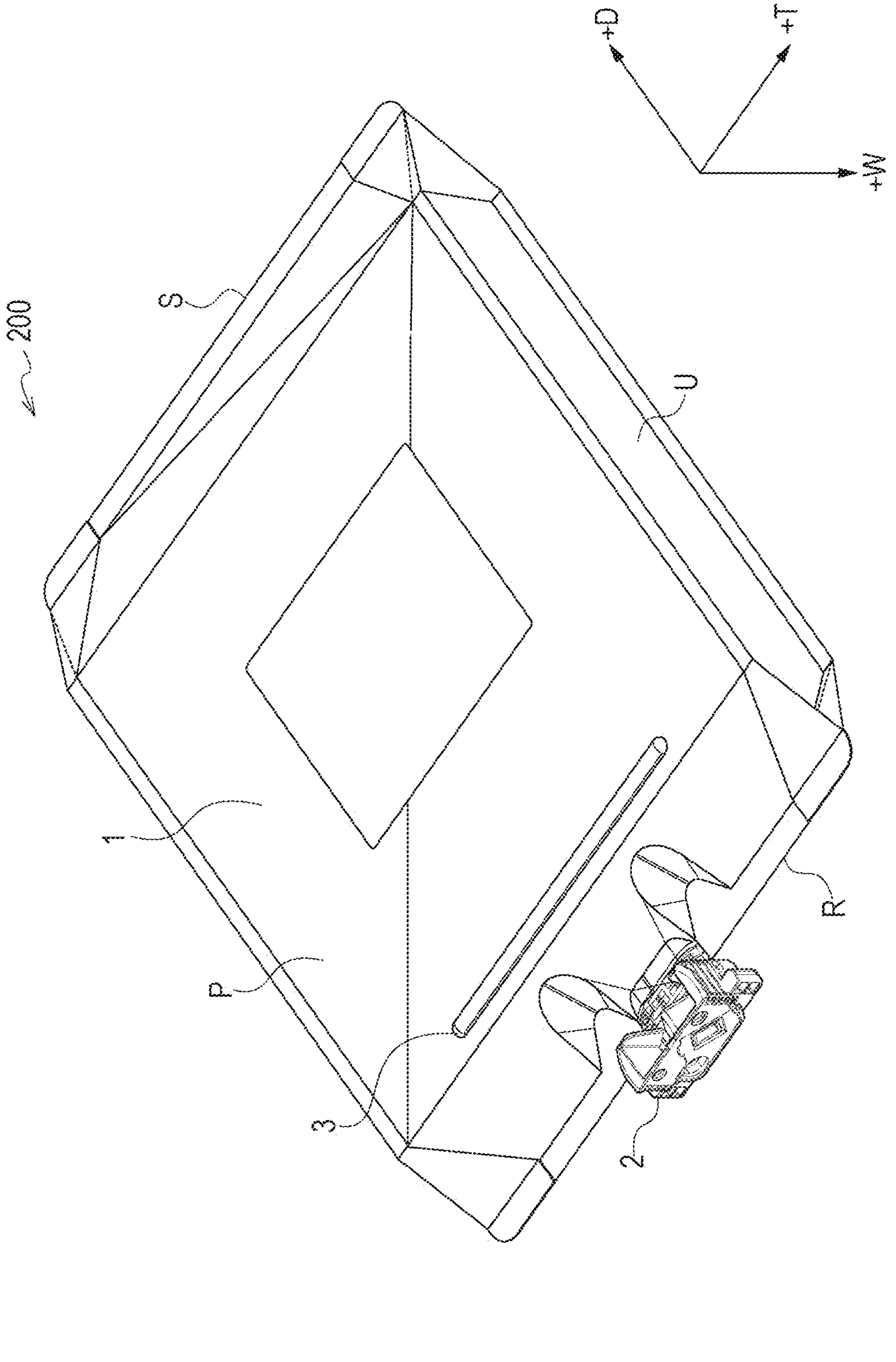
FIG. 1 is a perspective view of an ink container.

FIG. 1 is a perspective view of an ink container according to the present embodiment. The ink container of the present disclosure includes an ink storage portion 1 that has flexibility and that is configured to store ink therein and an ink supply member/portion 2 that supplies the ink stored in the ink storage portion to the outside. Note that, in the present specification, the term "ink" includes any liquid that can be used for forming an image onto a recording medium or processing the recording medium by being applied to the recording medium. Accordingly, the "ink" in the present specification is a concept that encompasses all liquids that can be used for recording. In addition, the concept of recording is not particularly limited, and it can be applied to industrial applications and the like. For example, it can be used in applications such as biochip production, printing of electronic circuits, and semiconductor substrate production.

Figure 2:
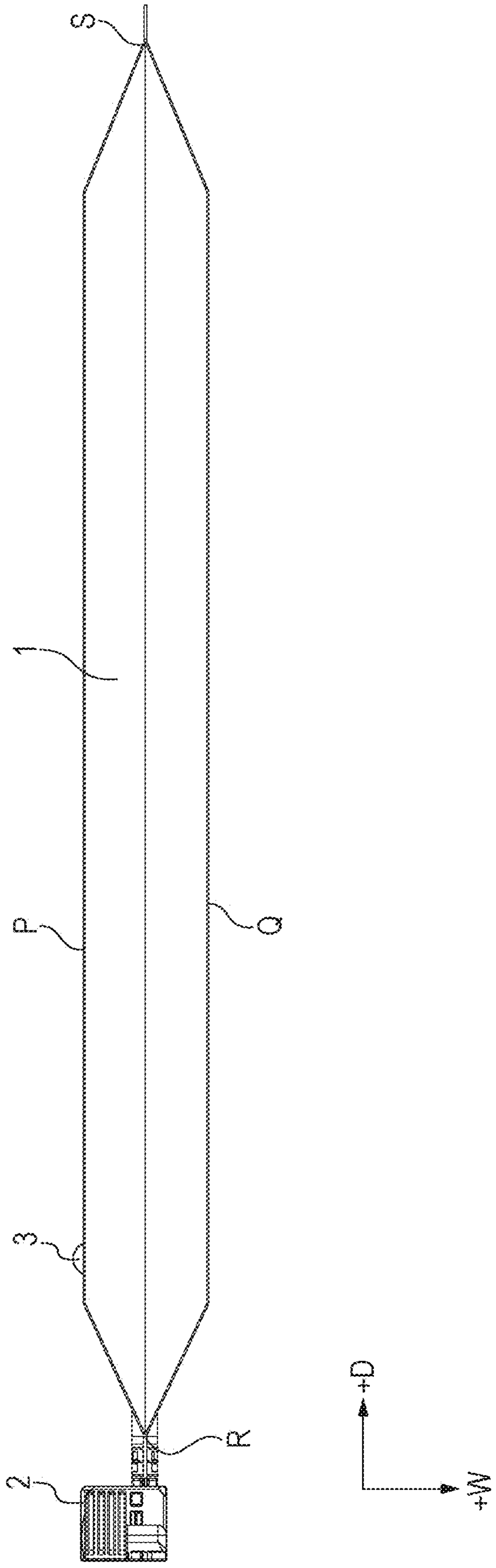
FIG. 2 is a plan view of the ink container as viewed from a positive T direction.

In order to describe the present disclosure, directions will be defined first. The direction of gravity when the ink container is left to stand will be referred to as a positive W direction. A surface of the ink container that faces downward when the ink container is left to stand is the same as the surface of the ink container that faces downward when the ink container is mounted on a recording apparatus. A horizontal direction when the ink container is left to stand will be referred to as a positive T direction. The direction opposite to the positive W direction will be referred to as a negative W direction, and the direction opposite to the positive T direction will be referred to as a negative T direction. In addition, a direction that is perpendicular to both the positive W direction and the positive T direction and that is a direction from one end of the ink container at which the ink supply member is provided to another end portion of the ink container will be referred to as a positive D direction. Accordingly, the direction in which the ink container is connected to the recording apparatus when the ink container is mounted on the recording apparatus is a negative D direction. In other words, the negative D direction is the direction in which an accommodating unit (described later) in which the ink container is to be accommodated is pushed into the recording apparatus, and the positive D direction is the direction in which the accommodating unit is pulled out from the inside of the recording apparatus to a position where the ink container becomes attachable and detachable. FIG. 2 is a diagram illustrating the ink container according to the present embodiment as viewed from the positive T direction.

(1) Ink Storage Portion

In the present disclosure, the ink storage portion 1 has flexibility and is configured to store the ink therein. Any known structure or shape may be employed as long as the ink storage portion 1 can store the ink.

Figure 3:
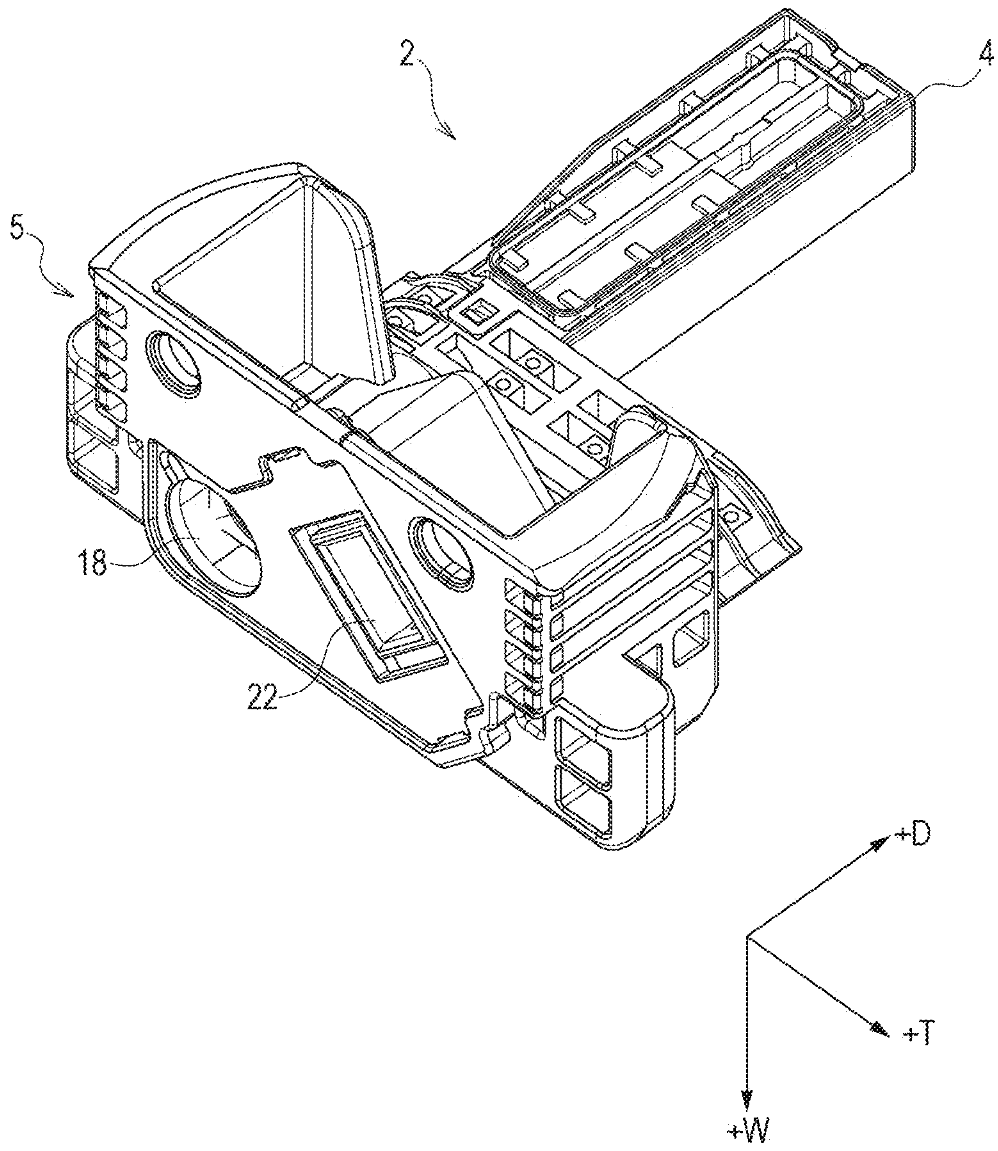
FIG. 3 is a perspective view of an ink supply member.
Figures 4A, 4B, 4C, 4D, 4E:
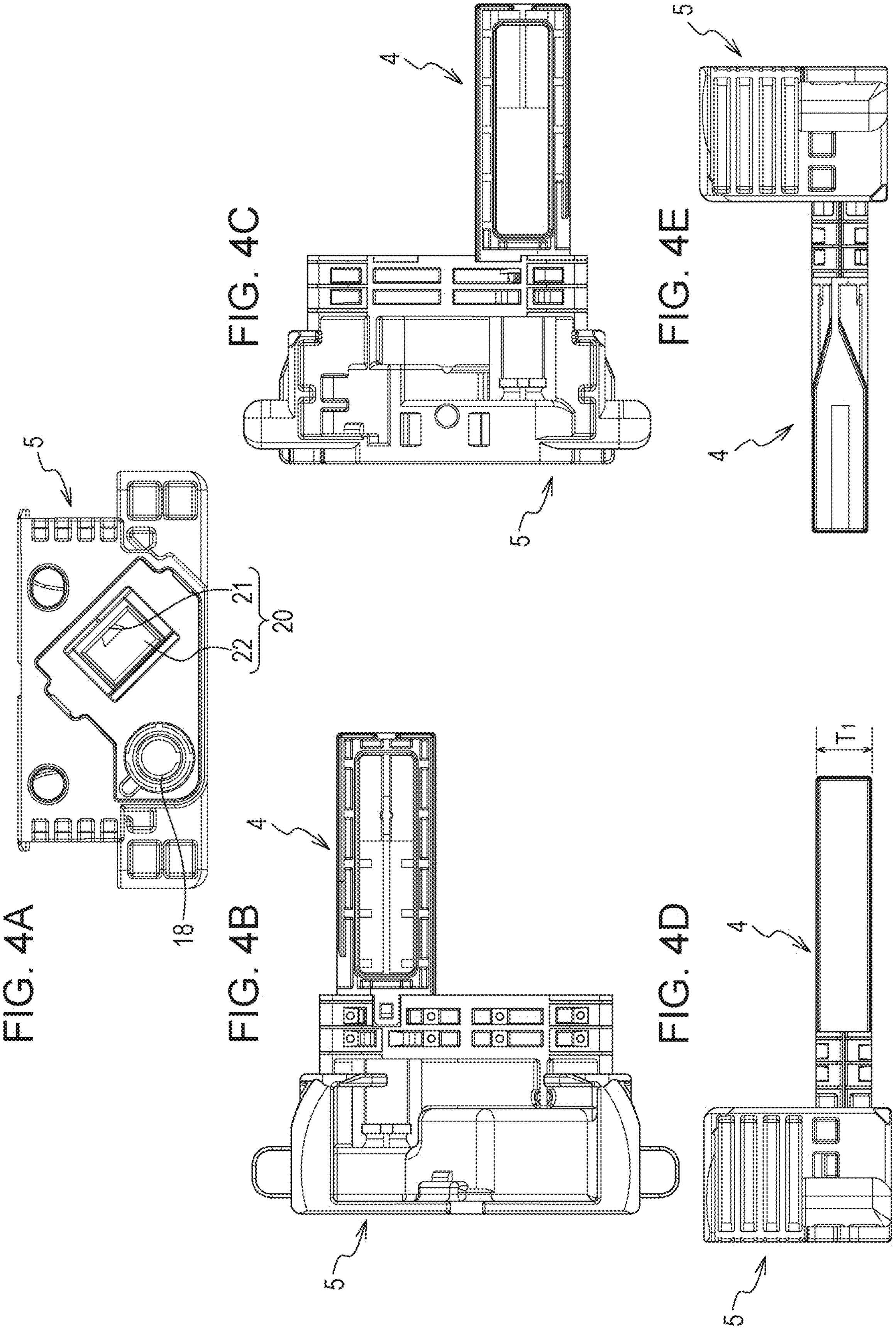
FIGS. 4A to 4E include plan views of the ink supply member as viewed from various directions.

In the present embodiment, the ink storage portion has at least (1) a first surface (P), (2) a second surface (Q) opposite to the first surface. A side shared by the first surface and the second surface will be referred to as (3) a first side (R), and the ink supply member 2 that supplies the ink stored in the ink storage portion to the outside is provided at the first side. FIG. 3 is a perspective view of the ink supply member according to the present embodiment. The ink supply member includes a first end portion that faces the interior of the ink storage portion and a second end portion that faces outward from the ink storage portion and that is opposite to the first end portion. FIG. 4A to FIG. 4E each illustrate the ink supply member illustrated in FIG. 3. FIG. 4A is a diagram as viewed from the negative D direction. FIG. 4B is a diagram as viewed from the negative W direction. FIG. 4C is a diagram as viewed from the positive W direction. FIG. 4D is a diagram as viewed from the positive T direction. FIG. 4E is a diagram as viewed from the negative T direction.

In the present embodiment, the first surface and the second surface share a second side (S) in addition to the first side. The second side is a side opposite to the first side, and the first surface and the second surface are sandwiched between the first and second sides. The second side is a side formed by sealing the first surface and the second surface together. However, the first surface and the second surface may be, for example, connected to each other by a gusset surface.

The ink storage portion according to the present embodiment further has (3) a first gusset surface (U) that is provided in the positive T direction and (4) a second gusset surface (V) that is provided in the negative T direction such that these gusset surfaces connect the first surface and the second surface to each other. In other words, the first gusset surface and the second gusset surface are surfaces opposite to each other, and the first surface and the second surface are sandwiched between these gusset surfaces. Note that, instead of connecting the first surface and the second surface to each other by the gusset surfaces, the first surface and the second surface may be directly connected to each other by sealing them together.

In the present embodiment, the ink storage portion has a substantially rectangular shape, a longitudinal direction of which corresponds to the D directions and a transverse direction of which corresponds to the T directions. However, the ink storage portion may have another quadrangular shape, such as a trapezoidal shape or a square shape, or may have a polygonal shape, such as a triangular shape or a pentagonal shape. The ink storage portion may have a shape in which, for example, a corner portion thereof is rounded.

As a method of manufacturing the ink storage portion having such a shape, a known method can be employed. More specifically, the ink storage portion may have a pillow-like shape that is formed by stacking two films and joining their peripheral portions together, or it may have a gusseted shape.

In the present disclosure, the ink storage portion has flexibility. In the present disclosure, the phrase "has flexibility" refers to being flexible and foldable.

As a material of the ink storage portion, any known material may be used as long as the ink storage portion can store the ink therein and has flexibility. Specific examples of the material include resin films made of polyethylene terephthalate (PET), polyamide (PA), polyethylene (PE), and polypropylene (PP), and the like. A film having a multilayer structure in which these resin films are laminated together may be used. Alternatively, a coated film or a vapor-deposited film obtained by imparting gas barrier properties or moisture barrier properties to these resin films may be used. Alternatively, a film formed by laminating a sheet or an aluminum foil onto a resin film may be used. For the purpose of storing the ink, a material capable of suppressing evaporation of moisture contained in the ink may be used. In particular, an aluminum foil may be used. The thickness of a film used for forming the ink storage portion may be 100 μm or more and 220 μm or less.

The ink storage portion may have a bag size suitable for its capacity. For example, in the case where the ink storage portion has a capacity of 1.5 L, the long sides of the ink storage portion are each about 374 mm, and the short sides of the ink storage portion are each about 180 mm. Gusset portions that are provided at the side surfaces of the ink storage portion in the longitudinal direction of the ink storage portion each have a width of about 46 mm. In the case where the ink storage portion has a capacity of 3.0 L, the long sides of the ink storage portion are each about 374 mm, and the short sides of the ink storage portion are each about 240 mm. Gusset portions that are provided at the side surfaces of the ink storage portion in the longitudinal direction each have a width of about 80 mm.

Figure 5A:
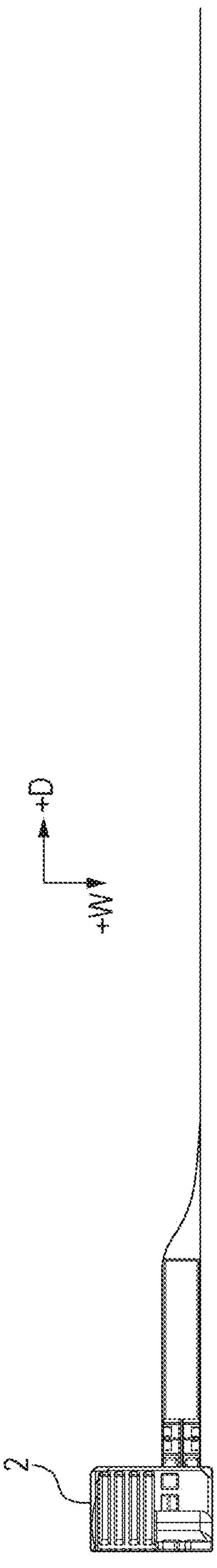
FIGS. 5A and 5B include diagrams each illustrating a state in which a flow path is blocked in the case where a ridge portion is not provided.
Figure 5B:
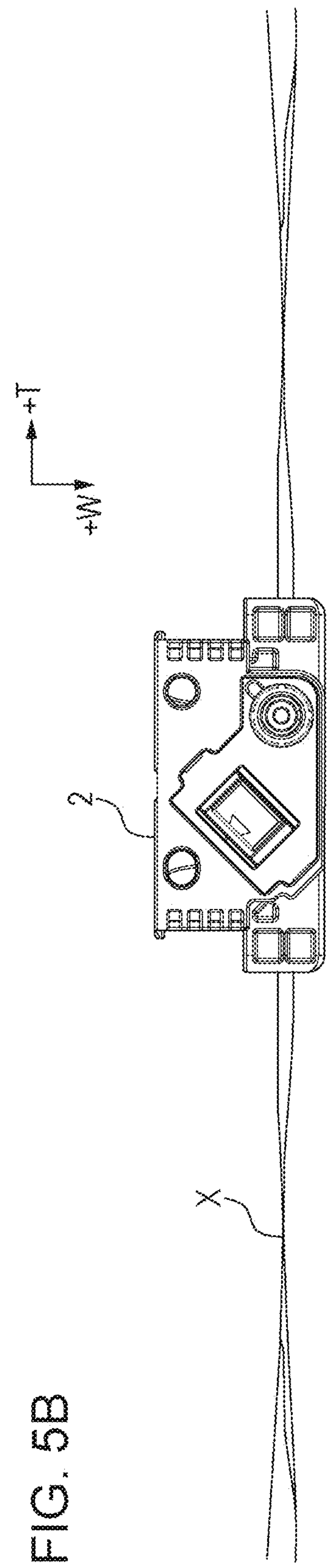
Figure 6A:
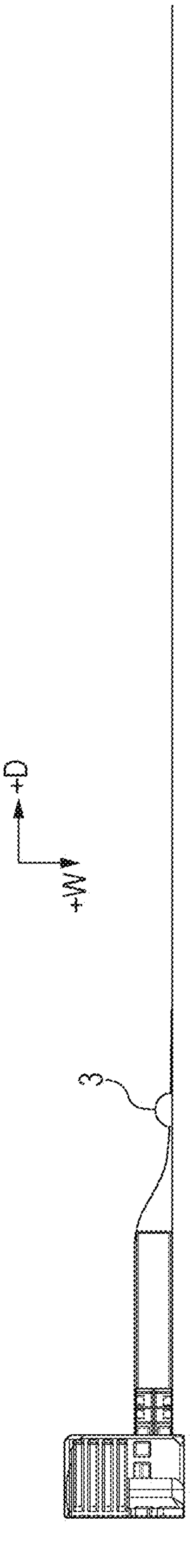
FIGS. 6A and 6B include diagrams each illustrating a state in which blockage of the flow path is suppressed by the ridge portion.
Figure 6B:
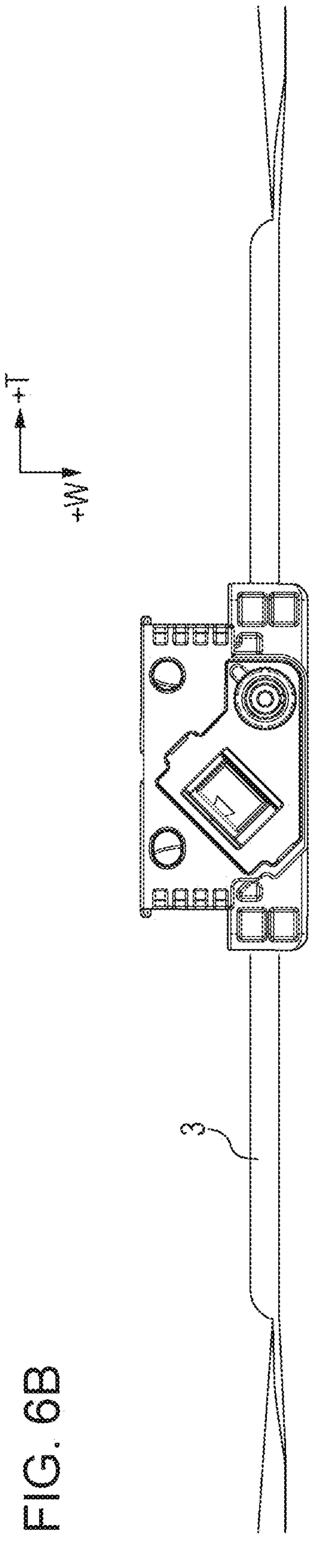
Figure 7:
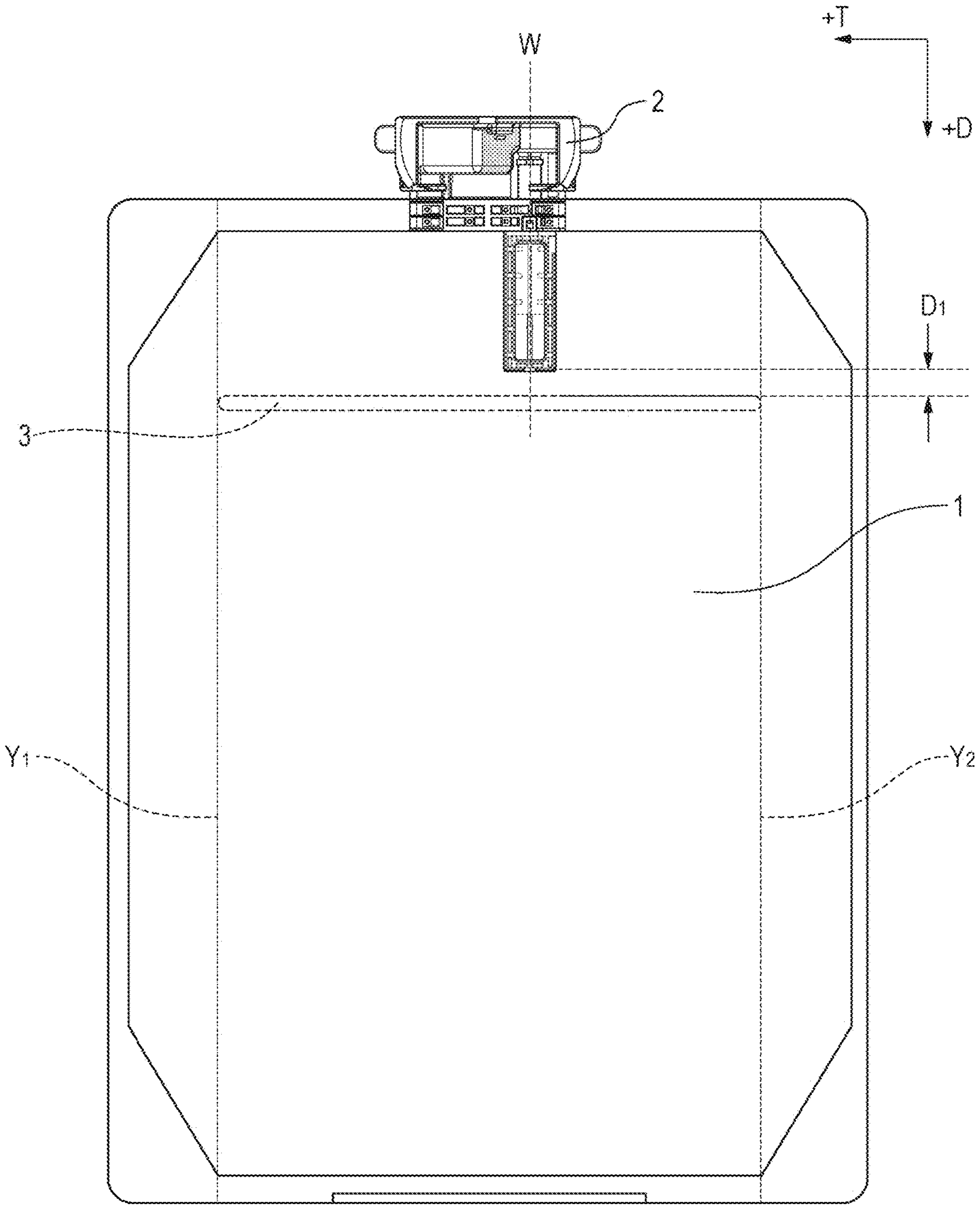
FIG. 7 is a transparent view of the ink container as viewed from a negative W direction.

In the present disclosure, a ridge portion 3 needs to be provided at a surface of the ink storage portion. The ridge portion may be formed by deforming the first surface of the ink storage portion by using a compressed-air method, a pressing method, a vacuum method, or the like. In the present disclosure, although the ink supply member is provided at the end of the ink storage portion, for example, a problem in which a passage (flow path) through which the ink flows toward the ink supply member becomes blocked due to the ink storage portion becoming deformed as the ink stored in the ink storage portion is consumed may occur in the absence of a liquid outlet tube or a spacer member such as that described in Japanese Patent Laid-Open No. 2019-107823, Japanese Patent Laid-Open No. 2021-014091, or the like. FIGS. 5A and 5B each illustrate a state in which the flow path is blocked in the case where the ridge portion is not provided in the present embodiment. In particular, a blocked portion is indicated by the reference character X in FIG. 5B. In order to suppress blocking of the flow path and to achieve using up all the ink stored in the ink storage portion, it is useful to ensure the flow path of the ink by providing the ridge portion at the surface of the ink storage portion (FIGS. 6A and 6B). The ridge portion may be provided at both the first and second surfaces. In the case of providing the ridge portion at only one of these surfaces, the ridge portion may be provided at the upper surface when the ink storage portion is mounted on the recording apparatus (the first surface of the ink storage portion in the above-described configuration). Although the ridge portion can be provided at any location on the surfaces of the ink storage portion to achieve its effect, it needs to be provided so as to cross an imaginary line obtained by extending a central axis of the ink supply member. FIG. 7 is a transparent view of the ink container according to the present embodiment as viewed from the negative W direction. The dotted line W illustrated in FIG. 7 corresponds to the imaginary line obtained by extending the central axis of the ink supply member. In FIG. 7, the ridge portion 3 is indicated by a dotted line.

In this case, when a distance from the first end portion of the ink supply member to an intersection point of the ridge portion and the imaginary line is denoted by $D_1$ [mm] and a thickness of the first end portion of the ink supply member is denoted by $T_1$ [mm], the ratio $D_1/T_1$ needs to be 5/8 or more and 40/8 or less. The distance $D_1$ from the first end portion of the ink supply member to the intersection point of the ridge portion and the imaginary line is illustrated in FIG. 7, and the thickness $T_1$ of the first end portion of the ink supply member is illustrated in FIG. 4D. In the present embodiment, in the case where the ink storage portion has a capacity of 1.5 L (each long side thereof is about 374 mm, each short side thereof is about 180 mm, and the width of each of the gusset portions is about 46 mm), $D_1$ [mm] of the ridge portion is 20 mm, and $T_1$ [mm] is 8 mm. In the case where the ink storage portion has a capacity of 3.0 L (each long side thereof is about 374 mm, each short side thereof is about 240 mm, and the width of each of the gusset portions is about 80 mm), $D_1$ [mm] of the ridge portion is 20 mm, and $T_1$ [mm] is 8 mm.

In addition, when a distance from the first side of the ink storage portion to the first end portion of the ink supply portion is denoted by $T_2$ [mm] and a distance from the first side to the second side is denoted by $T_3$, the ratio $T_2/T_3$ may be 1/10 or more and 3/10 or less.

In the case where the ink storage portion has (3) the first gusset surface and (4) the second gusset surface respectively provided in the positive T direction and the negative T direction so as to connect the first surface and the second surface to each other as in the present embodiment, the first gusset surface and a second gusset surface each include a folded portion that is provided so as to be folded toward the interior of the ink storage portion, and the shortest distance from the apexes of the folded portions to the two ends of the ridge portion needs to be 25 mm or less. In FIG. 7, the apexes of the folded portions of the gusset portions in the present embodiment are indicated by dotted lines $Y_1$ and $Y_2$. In the present embodiment, the distance from the apex of the folded portion of the first gusset surface to the corresponding end of the ridge portion and the distance from the apex of the folded portion of the second gusset surface to the corresponding end of the ridge portion are both 0 mm.

The length of the ridge portion may be 80 mm or more. Forming the ridge portion to be long helps in using up the ink present at the end portions of the ink storage portion in the positive T direction and the negative T direction.

In addition, the width of the ridge portion may be 2 mm or more, and is preferably 8 mm or less. The width of the ridge portion is more preferably 2 mm or more and 8 mm or less. The height of the ridge portion may be 0.5 mm or more, and is preferably 4.0 mm or less. The height of the ridge portion is more preferably 0.5 mm or more and 4.0 mm or less. By setting the width and height of the ridge portion within the above ranges, misalignment between the first surface (upper surface) and the second surface (lower surface) of the ink storage portion can be reduced, and welding of a welded portion can be improved.

Figure 8A:
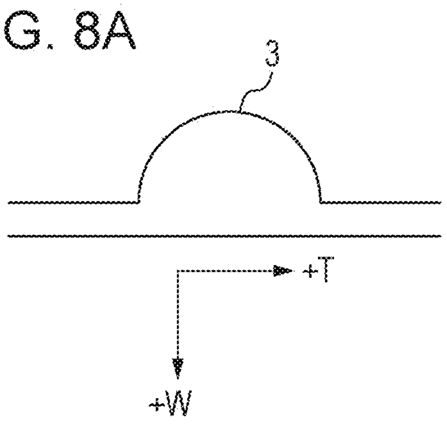
FIGS. 8A to 8G include diagrams illustrating variations of a cross-sectional shape of the ridge portion.
Figure 8B:
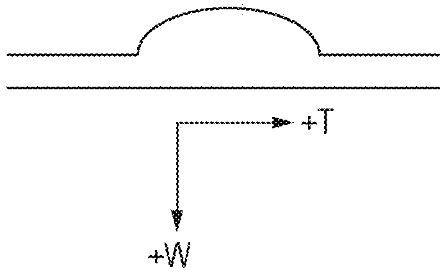
Figure 8C:
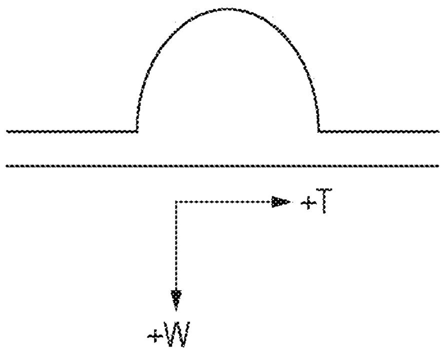
Figure 8D:
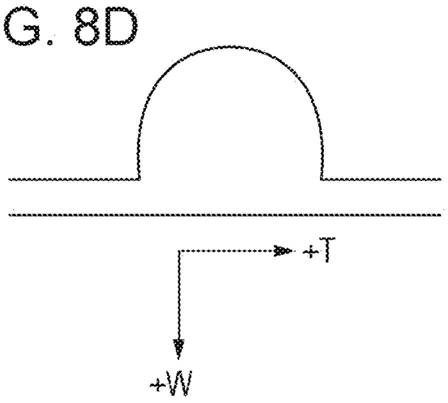
Figure 8E:
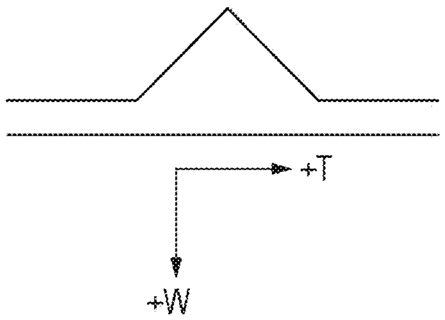
Figure 8F:
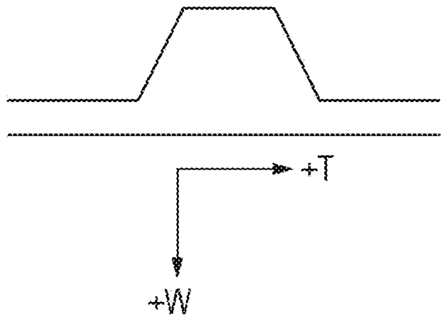
Figure 8G:
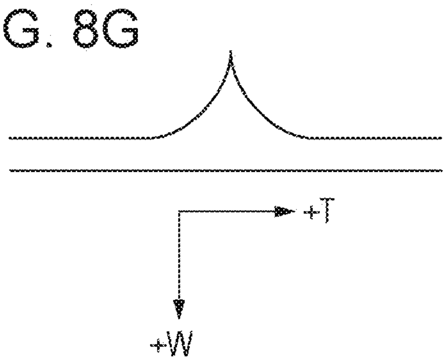

The cross-sectional shape of the ridge portion may be any shape as long as the ink flows as illustrated in FIGS. 8A to 8G. In particular, as illustrated in FIG. 8A, the cross-sectional shape of the ridge portion may be a semi-elliptical shape.

Figure 9A:
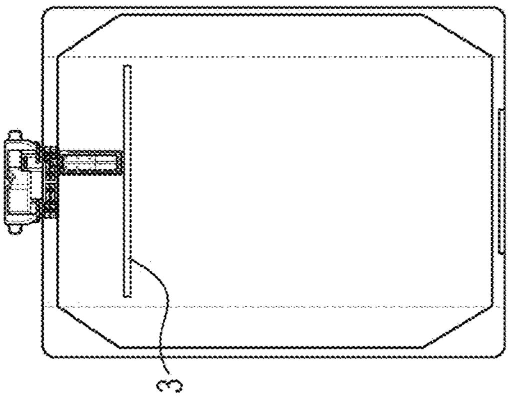
FIGS. 9A to 9G include diagrams illustrating the shape of the ridge portion in a plan view.
Figure 9B:
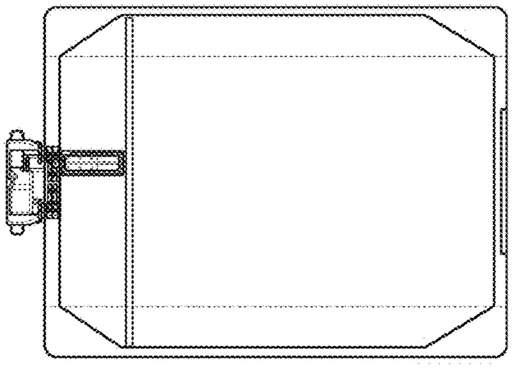
Figure 9C:
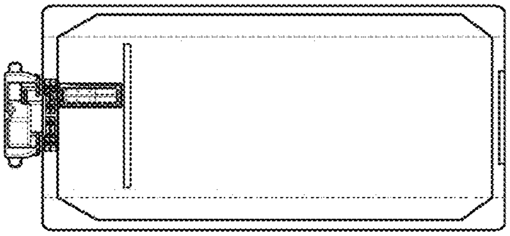
Figure 9D:
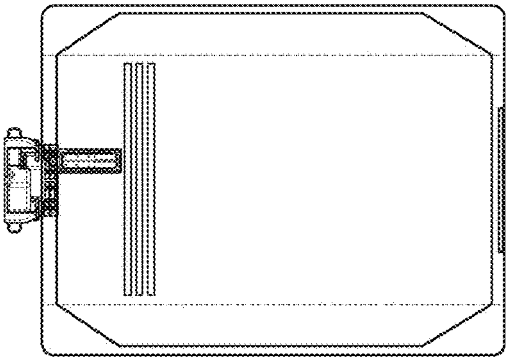
Figure 9E:
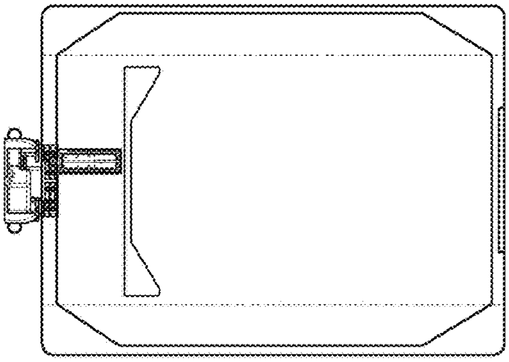
Figure 9F:
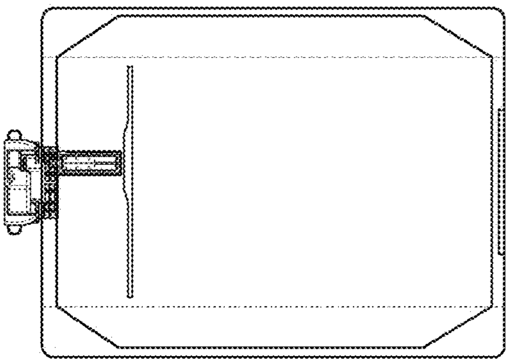
Figure 9G:
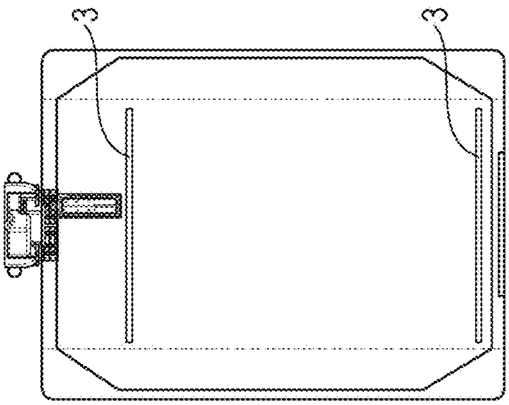

The shape of the ridge portion in plan view may be any shape as long as the effect of the present disclosure can be obtained as illustrated in FIGS. 9A to 9G. For example, a plurality of ridge portions may be provided so as to be approximately parallel to each other (FIG. 9D), or the ridge portion may be partially widened (FIG. 9E). In the case where a plurality of ridge portions are provided, one ridge portion may be provided on the first side, and the other ridge portion may be provided on the second side (FIG. 9G).

Figure 10:
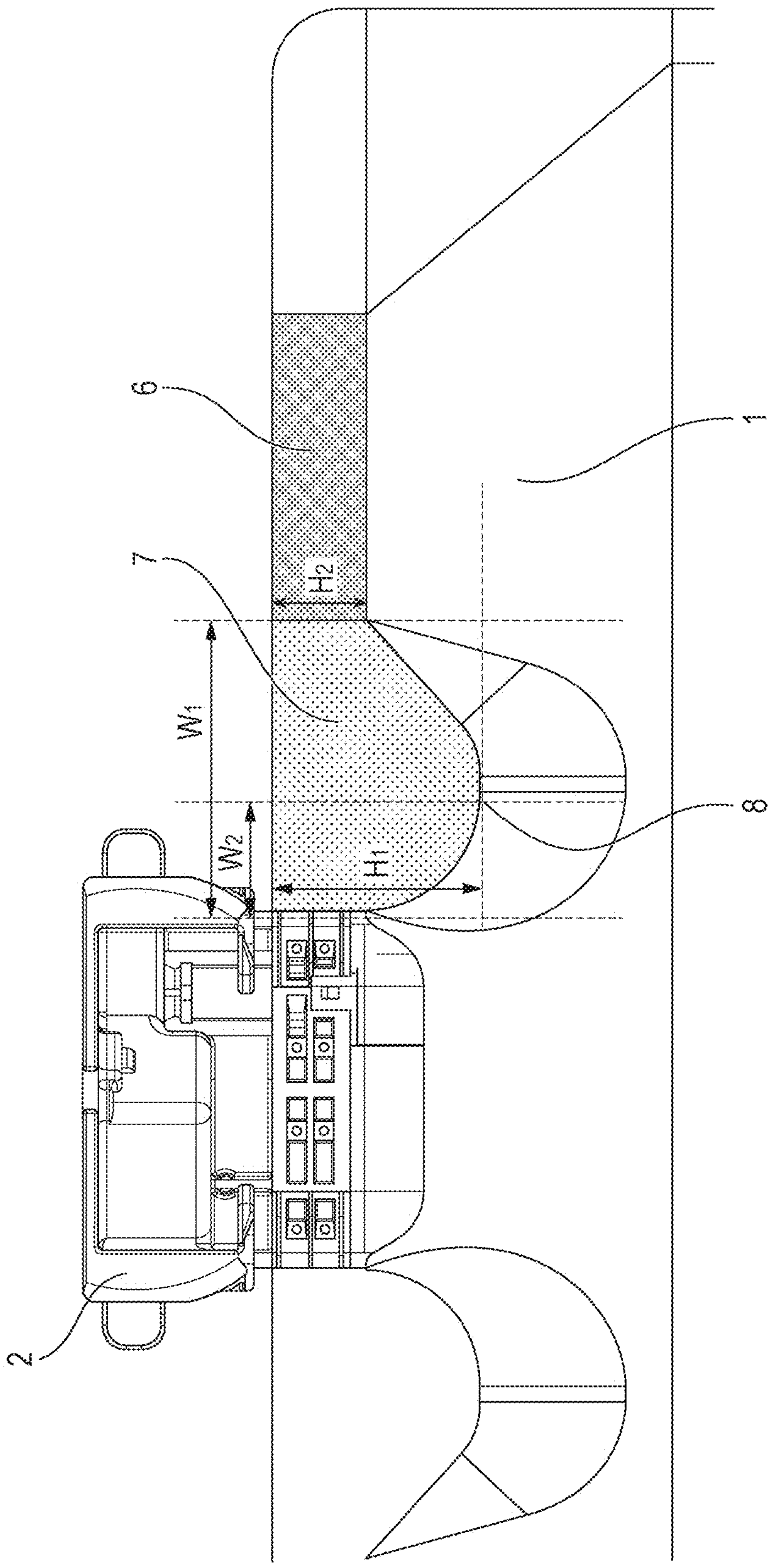
FIG. 10 is a diagram illustrating a seal portion of the ink container.

In the present embodiment, as described above, a configuration is employed in which an ink outlet is provided in the vicinity of an end portion of a flexible ink storage portion. However, if the ink container falls with the ink supply member facing downward, a problem may occur in that the ink supply member may become deformed, due to an impact generated as a result of the ink container having fallen, such that it digs into the ink storage portion. In order to address this problem, for example, a method of increasing a seal width of a seal portion that is provided at an end portion of the ink storage portion (a seal portion between the first surface and the second surface) across the entire side of the ink storage portion on which the ink supply member is provided may be considered. This method suppresses the above-mentioned deformation. However, the amount of ink that can be stored is reduced, which is not favorable. Accordingly, a method of providing a portion having a large seal width only in the vicinity of the ink supply member was considered. However, it was found that, when the portion having a large seal width has a rectangular shape, a stress is likely to be concentrated at a corner portion, whereas the ease of sealing can be ensured, and thus, breakage may sometimes occur starting from the corner portion. In view of the above, the inventors of the present disclosure have further examined the shape and arrangement of the portion having a large seal width. As a result, it was found that, as illustrated in FIG. 10, the seal portion between the first surface and the second surface may have a first seal portion 6 having a rectangular shape parallel to the first side and a second seal portion 7 that is disposed between the first seal portion and the ink supply member and formed continuously with the first seal portion in a direction parallel to the first side and that has a mountain-like shape toward the interior of the ink storage portion. The seal portion may be provided on opposite sides of the first side of the ink storage portion such that the ink supply portion is sandwiched between the seal portions.

When a maximum width of the mountain-like shape is denoted by $W_1$ [mm], an apex 8 of the mountain-like shape of the second seal portion may be positioned such that a distance $W_2$ [mm] from the ink supply member in the direction parallel to the first side is less than $W_1/2$. In addition, when the height of the apex of the mountain-like shape from the first side is denoted by $H_1$ [mm], the ratio ($H_1/W_2$) of $H_1$ to $W_2$ may be 1.5 or more, and is preferably 1.8 or more and 2.2 or less. As $H_1$ becomes larger with respect to $W_2$, the effect of suppressing the ink supply member from digging in at the time of falling increases.

In addition, when a height of the first seal portion from the first side is denoted by $H_2$ [mm], $0.83 \leq (H_1-H_2)/H_2 \leq 1.5$ may be satisfied.

Although the shape of this seal portion may be a mountain-like shape, in particular, an outer edge of the second seal portion from the apex of the mountain-like shape to the ink supply member may include a curved portion with a radius of curvature R of 10 mm or more. It is preferable to include a curved portion with the radius of curvature R of 10 mm or more and 15 mm or less. By providing the curved portion, the stress generated at the time of falling is further dispersed.

In addition, the outer edge of the second seal portion from the apex of the mountain-like shape to a connection portion in which the first seal portion and the second seal portion are connected to each other may include a linear portion.

As described above, the seal portions may be provided on both sides of the ink supply member at the first side of the ink storage portion such that the ink supply member is sandwiched between the seal portions. In this case, the distance between the apexes of the mountain-like shapes of the seal portions, which are provided on the opposite sides of the ink supply member, may be 70 mm or more and 90 mm or less, and is preferably 75 mm or more and 85 mm or less. In addition, the distance between the ends of the mountain-like shapes, each of the ends being closest to the ink supply portion, may be 40 mm or more and 70 mm or less, and is preferably 45 mm or more and 60 mm or less.

(2) Ink Supply Member

Figure 11B:
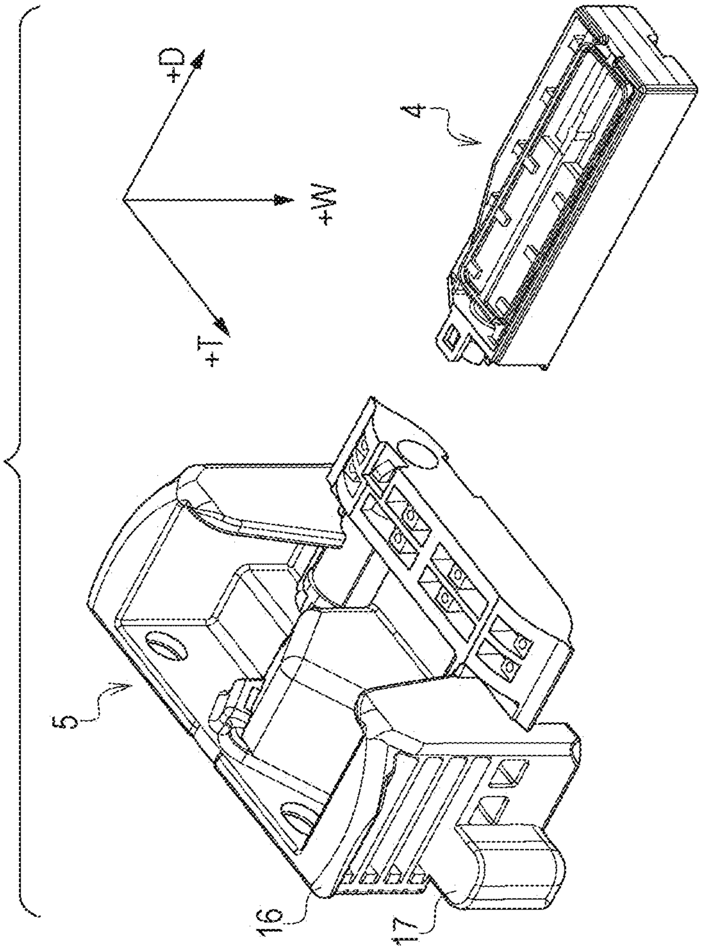
FIGS. 11A and 11B include perspective views of an ink inlet member and an ink outlet member.
Figure 11A:
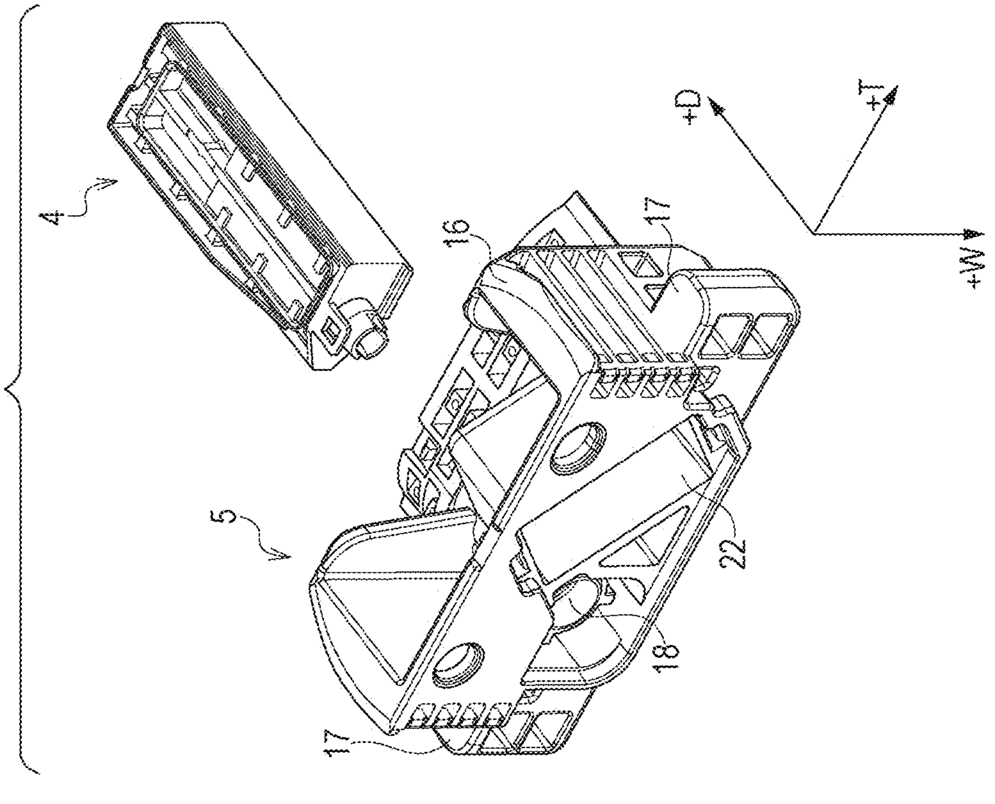
Figure 12B:
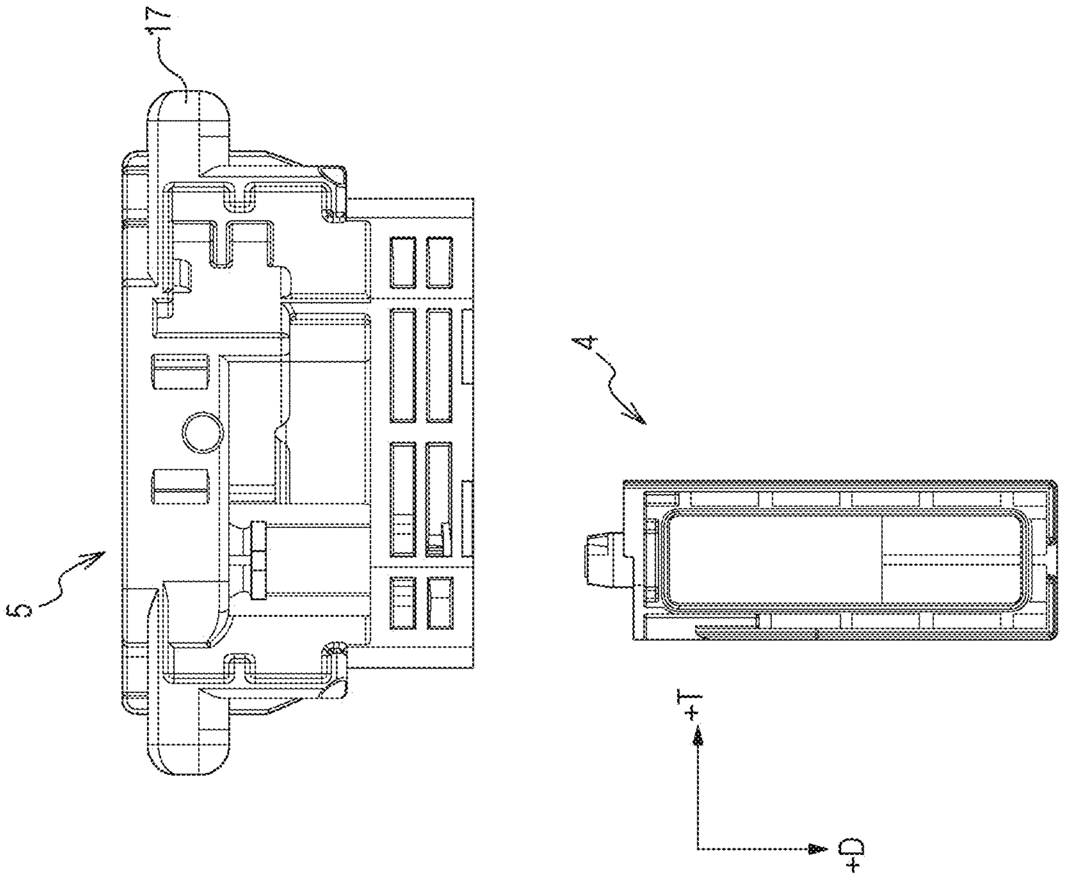
FIGS. 12A and 12B include plan views of the ink inlet member and the ink outlet member.
Figure 12A:
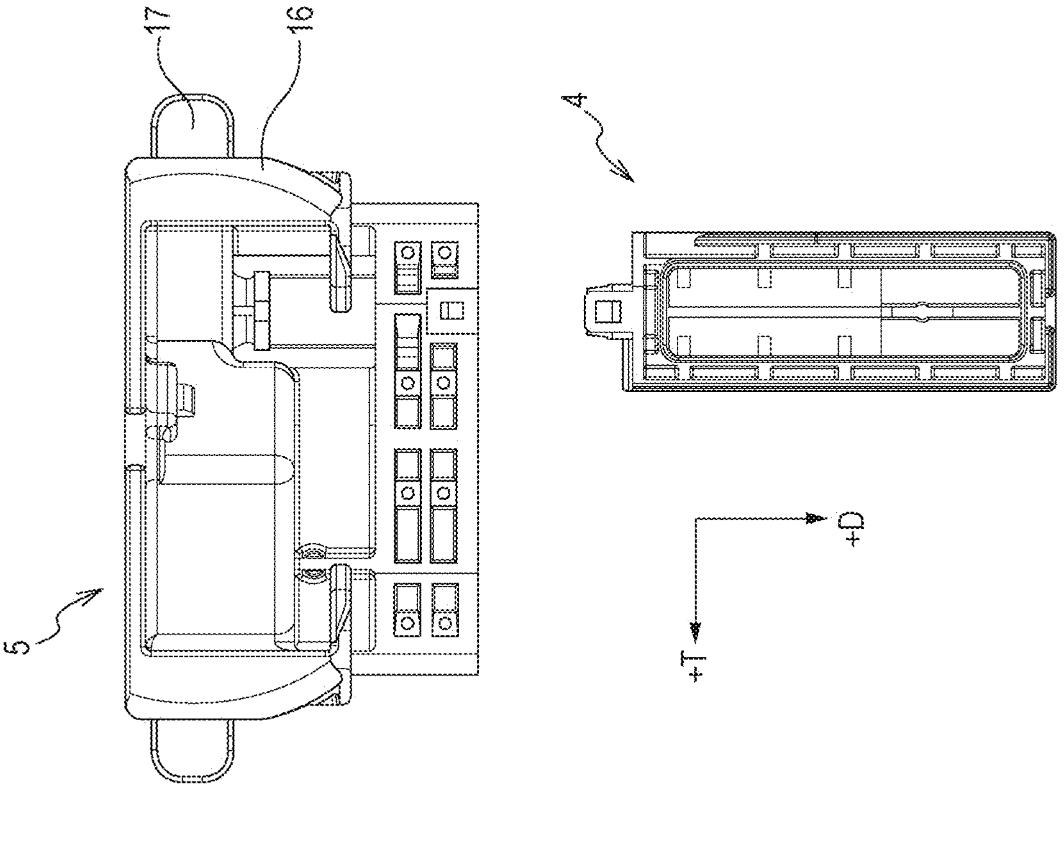

In the present disclosure, the ink supply member may have any structure or shape as long as it is configured to supply the ink stored in the ink storage portion to the outside. In the present disclosure, as described above, the ink supply member is provided at the first side of the ink storage portion for the purpose of reducing the amount of plastic used in the ink container. FIG. 3 is a perspective view of the ink supply member according to the present embodiment. In the present embodiment, the ink supply member is divided into two members that are an ink inlet member 4 (also referred to as a filter case) on the first end portion side and an ink outlet member 5 on the second end portion side. Although the ink inlet member 4 and the ink outlet member 5 are attachable to and detachable from each other, they may be integrally formed. FIGS. 11A and 11B include perspective views illustrating a case where the ink supply member is divided into the two members, which are the ink inlet member 4 and the ink outlet member 5, and FIGS. 12A and 12B include plan views illustrating the case where the ink supply member is divided into the two members, which are the ink inlet member 4 and the ink outlet member 5. In particular, FIG. 12A is a plan view as viewed from the negative W direction (a top view in a usage position), and FIG. 12B is a plan view as viewed from the positive W direction (a bottom view in the usage position).

(2-1) Ink Inlet Member, Filter Case

Figure 13A:
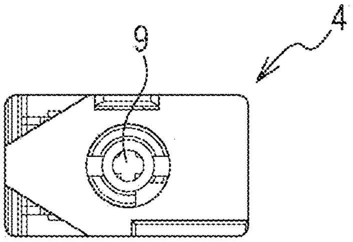
FIGS. 13A to 13F include plan views of the ink inlet member as viewed from various directions.
Figure 13B:
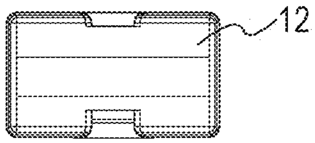
Figure 13C:
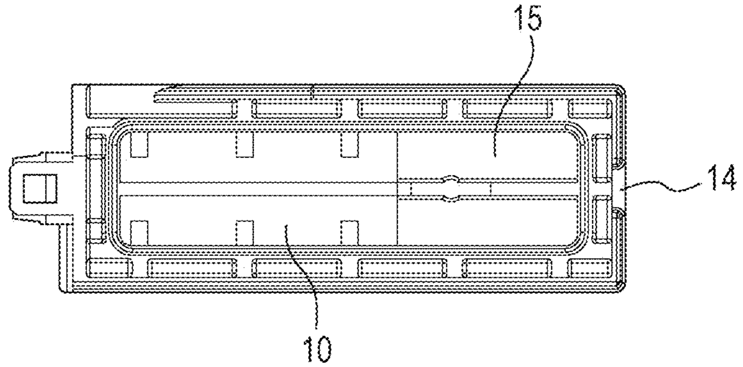
Figure 13D:
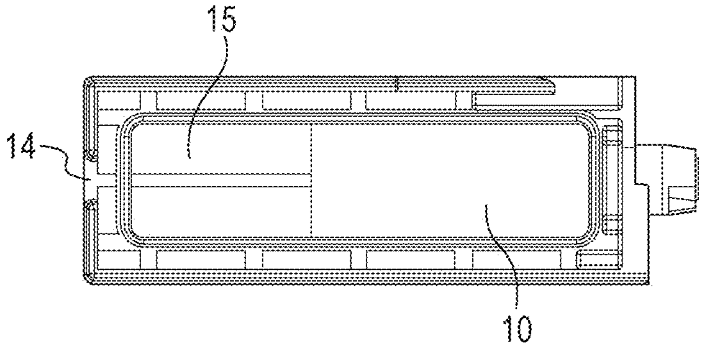
Figure 13E:
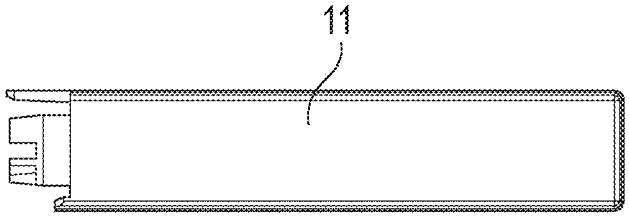

The ink inlet member serving as a member of the ink supply member may at least be configured such that the ink stored in the ink storage portion is introduced thereinto and may have at least an inlet port 9. FIG. 13A to FIG. 13F each illustrate the ink inlet member 4. FIG. 13A is a diagram as viewed from the negative D direction. FIG. 13B is a diagram as viewed from the positive D direction. FIG. 13C is a diagram as viewed from the negative W direction. FIG. 13D is a diagram as viewed from the positive W direction. FIG.

Figure 13F:
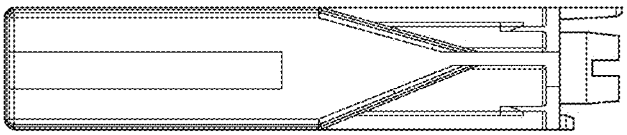

13E is a diagram as viewed from the positive T direction. FIG. 13F is a diagram as viewed from the negative T direction.

In particular, in the case where the ink container is left as it is, the density of the ink in the ink storage portion may become non-uniform. In such a case, if the ink having high density is supplied to the recording apparatus, there is a possibility that a problem such as decreased discharge stability will occur, and thus, it may be considered to suppress an increase in the density of the ink in the vicinity of the ink inlet member. For example, providing a mechanism that stirs the interior of the ink container may be considered. However, in this case, the container becomes complex, which is not favorable. Variations of the ink inlet member in the present embodiment will be described below with reference to FIGS. 14A to 14J.

Note that FIGS. 14A, 14C, 14E, 14G, and 14I are schematic plan views of the ink inlet member as viewed from the negative W direction, and FIGS. 14B, 14D, 14F, 14H, and 14J are schematic transparent views of the ink inlet member as viewed from the positive T direction.

Figure 14A:
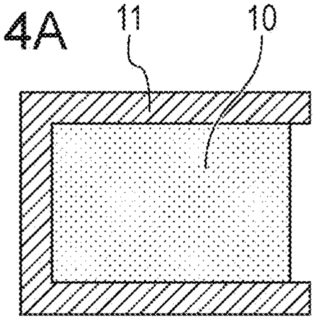
FIGS. 14A to 14J include diagrams illustrating a configuration of the ink inlet member.
Figure 14B:
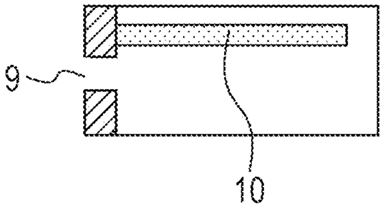
Figure 14C:
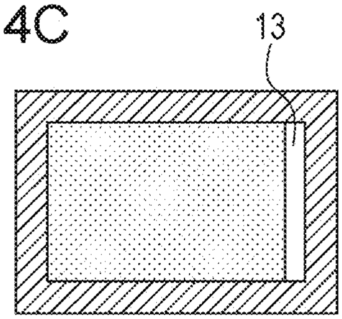
Figure 14D:
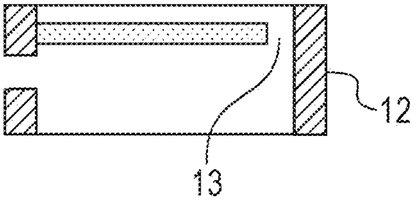
Figure 14E:
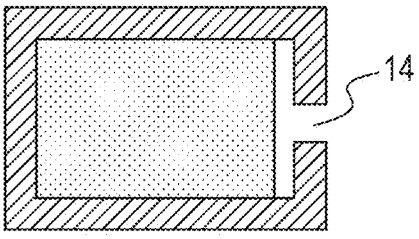
Figure 14F:
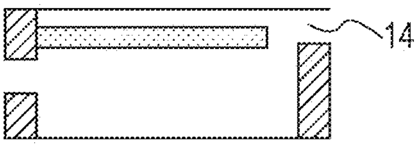
Figure 14G:
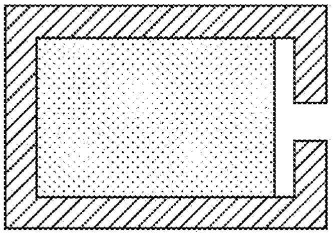
Figure 14H:
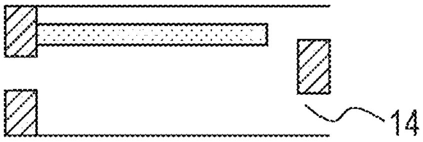

First, as illustrated in FIGS. 14A and 14B, the ink inlet member may have a first wall 10 that is positioned above the inlet port in the direction of gravity (the negative W direction) and that protrudes in the positive D direction is provided. The ink inlet member may further have a side wall 11 that is provided such that portions of the side wall 11 sandwich the first wall from the positive T direction and the negative T direction. In addition, the ink supply member may have a second wall 12 that is provided at a position opposite to the inlet port as illustrated in FIGS. 14C and 14D. In this case, a gap 13 is formed between the first wall and the second wall in the positive D direction, and as a result, the ink can be injected through the gap.

As illustrated in FIGS. 14E and 14F or FIGS. 14G and 14H, an end portion of the second wall in the positive W direction and/or an end portion of the second wall in the negative W direction may have a cutout 14. By providing the cutout, the flow path through which the ink flows can be ensured between the ink inlet member and the ink storage portion even when the ink storage portion becomes deformed as a result of the ink stored in the ink storage portion being consumed and then the upper surface (first surface) and the lower surface (second surface) of the ink storage portion come into close contact with each other. In this case, the area of the cutout formed at the end portion in the positive W direction may be larger than the area of the cutout formed at the end portion in the negative W direction. When the ink container is left to stand, the density of the ink may sometimes become higher in the positive W direction, which is the direction of gravity, than in the negative W direction. In this case, the ink with a higher density becomes more viscous, making it harder to be drawn in. Thus, by increasing the size of the cutout in the positive W direction, where the ink is less likely to be drawn in, it becomes possible for the ink to be drawn in through both the cutout in the positive W direction and the cutout in the negative W direction at a ratio close to 1:1.

Figure 14I:
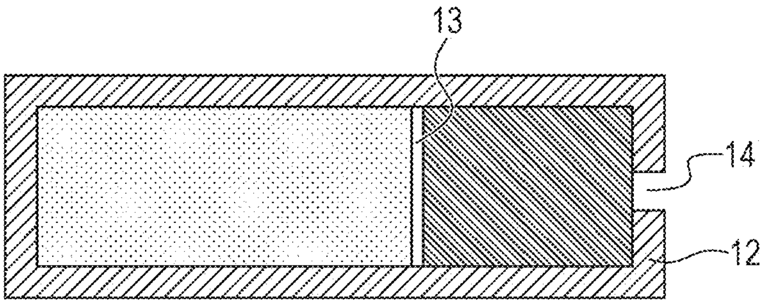
Figure 14J:
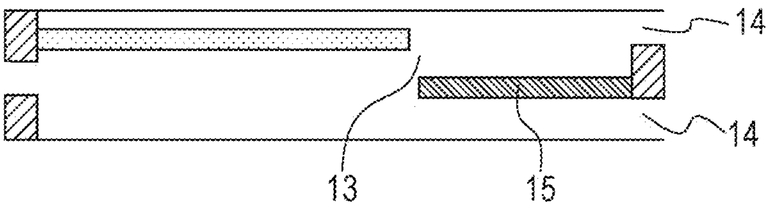

In addition, as illustrated in FIGS. 14I and 14J, a third wall 15 may be provided so as to protrude from the second wall in the negative D direction. In this case, a gap may be formed between the first wall and the third wall in the positive W direction. In addition, the third wall may be provided at a position shifted in the positive W direction with respect to the first wall. Also in this case, a configuration in which the end portion of the second wall in the positive W direction and/or the end portion of the second wall in the negative W direction may have a cutout may be employed. Note that FIGS. 14I and 14J are diagrams schematically illustrating the embodiment illustrated in FIGS. 13A to 13F.

Although it is obvious that the ink inside the ink storage portion is treated to prevent foreign matter such as dust from mixing with it, the ink storage portion may have a function of serving as a filter in such a manner as to prevent foreign matter that has unintentionally mixed during the manufacturing process from moving to the recording apparatus. As described above, the ink storage portion can have a function of serving as a filter by narrowing the gap between the walls. Alternatively, a mesh filter or the like may be attached as an actual filter. More specifically, a filter may be provided so as to connect the second wall and the wall having the inlet port to each other. Although the filter may be provided only on one side, the mixing of foreign matter can be more effectively suppressed by providing the filter in both the positive W direction and the negative W direction.

In a direction perpendicular to the first side of the ink storage portion, an end portion of the ink inlet member (the first end portion of the ink supply member) may be positioned within 60 mm of the first side, preferably within 52 mm of the first side, and more preferably 40 mm or more from the first side. In addition, when a distance from the first side of the ink storage portion to the first end portion of the ink supply member is denoted by $T_2$ [mm] and a distance from the first side to the second side is denoted by $T_3$ [mm], the ratio $T_2/T_3$ may be 1/10 or more and 3/10 or less.

(2-2) Ink Outlet Member

Figure 15C:
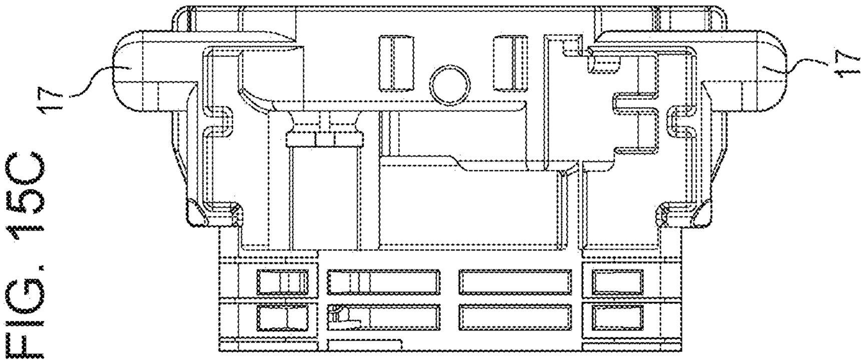
FIGS. 15A to 15E include plan views of the ink outlet member as viewed from various directions.
Figure 15B:
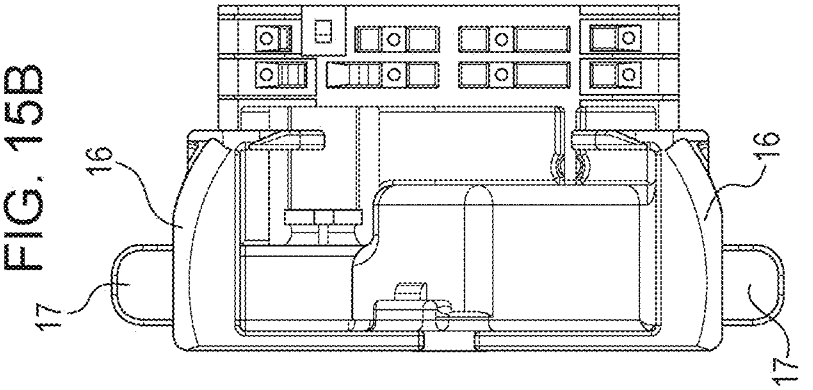
Figure 15A:
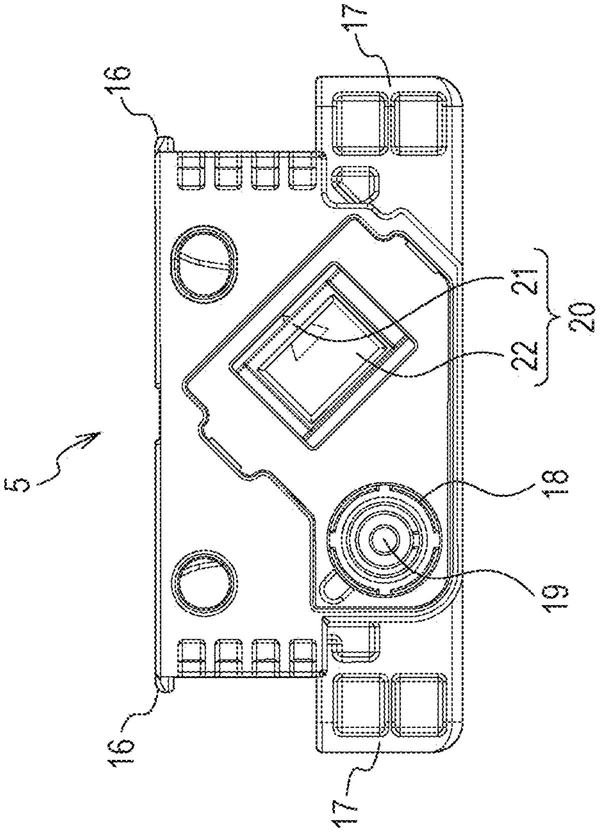
Figure 15E:
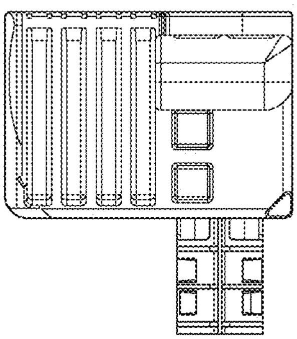
Figure 15D:
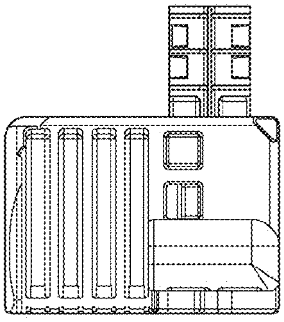

FIG. 15A to FIG. 15E each illustrate the ink outlet member 5. FIG. 15A is a diagram as viewed from the negative D direction. FIG. 15B is a diagram as viewed from the negative W direction. FIG. 15C is a diagram as viewed from the positive W direction. FIG. 15D is a diagram as viewed from the positive T direction. FIG. 15E is a diagram as viewed from the negative T direction.

Figure 16:
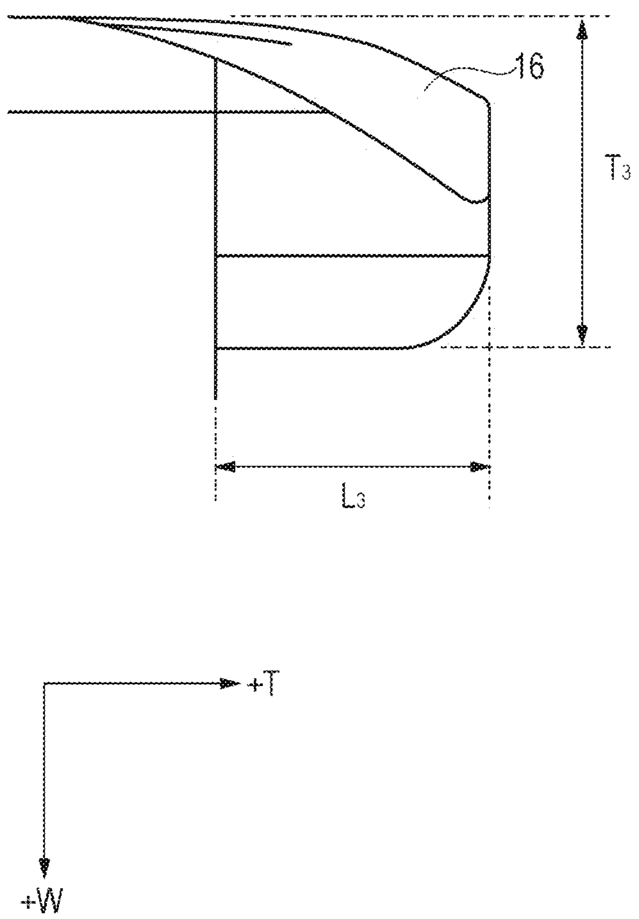
FIG. 16 is an enlarged view of a first protruding portion.

The ink outlet member may include first protruding portions 16 one of which protrudes in the positive T direction and the other of which protrudes in the negative T direction, and the first protruding portions 16 may each be provided at an end portion of the ink outlet member in the negative W direction (an end portion located on the upper side when the ink container is left to stand, an end portion on the first surface side of the ink storage portion). By providing the first protruding portions, the first protruding portions may each serve as a handle when a user holds the ink container. In particular, such a simple mechanism may enable the user to hold the ink container so that the amount of plastic used in the ink container may be reduced. From such a standpoint, the width (protrusion width, protrusion amount) of each of the first protruding portions in the T directions may be 3.0 mm or less. In addition, the width (thickness) of each of the first protruding portions in the W directions may be 3.0 mm or less. The lower limits of these may each be 1.0 mm or more from the standpoint of the strength of a holding portion. FIG. 16 is an enlarged plan view of one of the first protruding portions 16 as viewed from the negative D direction. In FIG. 16, the width (protrusion width, protrusion amount) of the first protruding portion in the T directions is denoted by $L_3$, and the width (thickness) of the first protruding portion in the W directions is denoted by $T_3$.

Figure 17B:
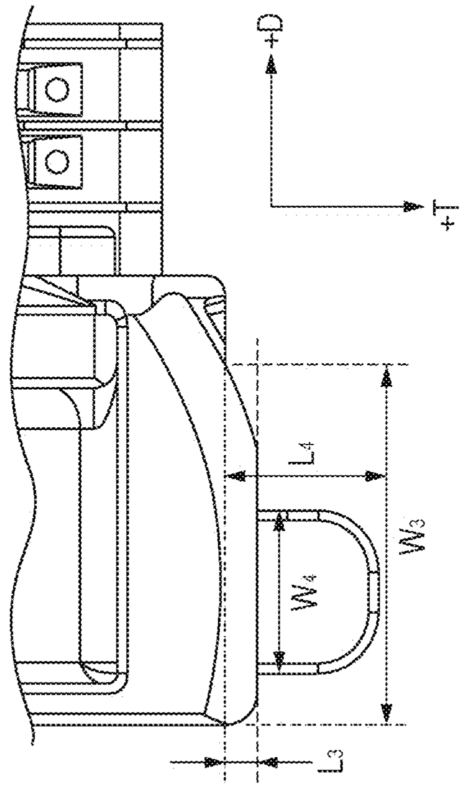
FIGS. 17A and 17B include enlarged views of a second protruding portion.
Figure 17A:
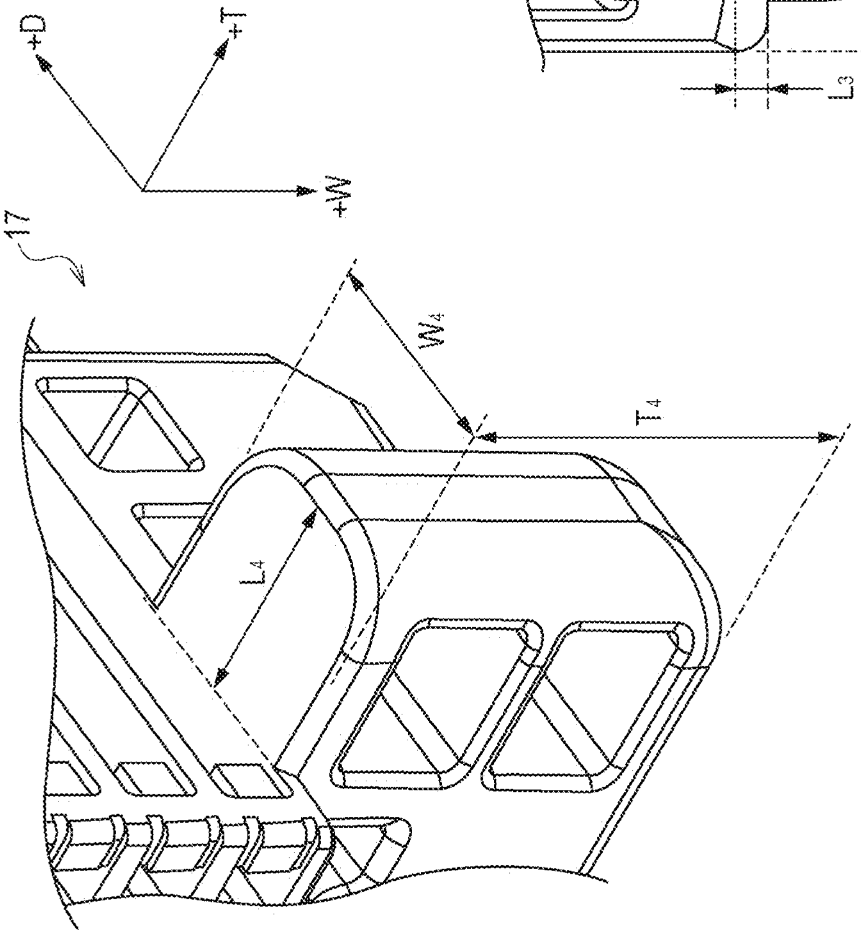

The ink supply member may further include second protruding portions 17 one of which protrudes in the positive T direction and the other of which protrudes in the negative T direction, and the second protruding portions 17 may each be provided at an end portion of the ink supply member in the positive W direction (an end portion located on the lower side when the ink container is left to stand, an end portion on the second surface side of the ink storage portion). By providing the second protruding portions, positioning of the ink container with respect to the recording apparatus becomes easier when mounting the ink container onto the recording apparatus. The width (protrusion width, protrusion amount) of each of the second protruding portions in the T directions may be 3.0 mm or more and 10.0 mm or less, and is preferably 5.0 mm or more and 9.0 mm or less. In addition, the width (thickness) of each of the second protruding portions in the W directions may be 3.0 mm or more and 20.0 mm or less, and is preferably 5.0 mm or more and 16.0 mm or less. Furthermore, the width of each of the second protruding portions in the D directions may be 3.0 mm or more and 10.0 mm or less, and is preferably 5.0 mm or more and 10.0 mm or less. FIG. 17A is an enlarged perspective view of one of the second protruding portions 17. In FIG. 17A, the width (protrusion width, protrusion amount) of the second protruding portion in the T directions is denoted by $L_4$. The width (thickness) of the second protruding portion in the W directions is denoted by $T_4$. The width of the second protruding portion in the D directions is denoted by $W_4$. FIG. 17B is an enlarged plan view (top view in the usage position) of one of the first protruding portions 16 and one of the second protruding portions 17 as viewed from the negative W direction. In FIG. 17B, the width of the first protruding portion in the D directions is denoted by $W_3$.

In particular, each of the second protruding portions may have a protrusion amount in the positive T direction (and the negative T direction) larger than that of each of the first protruding portions, that is, $L_3<L_4$ may be satisfied. With such a relationship, when the user mounts the ink container onto the recording apparatus, the user can visually check the ends of the second protruding portions, which are used for positioning, from above while holding a first protruding portion, and thus, the mounting process becomes easier (with improved visibility during mounting). In addition, in the positive D direction, the width $W_3$ of each of the first protruding portions may be larger than the width $W_4$ of each of the second protruding portions, that is, $W_4<W_3$ may be satisfied, so that the user can easily hold the ink container when mounting the ink container onto the recording apparatus.

The ratio ($L_3/L_4$) of the protrusion amount $L_3$ of each of the first protruding portions in the T directions to the protrusion amount $L_4$ of each of the second protruding portions in the T directions may be 1/10 or more and less than 1, and is preferably 1/10 or more and 1/3 or less.

The ratio ($W_4/W_3$) of the width $W_4$ of each of the second protruding portions in the D directions to the width $W_3$ of each of the first protruding portions in the D directions may be 3/22 or more and less than 1, and is preferably 5/22 or more and 10/22 or less.

In addition, in the W directions, the ratio ($T_3/T_4$) of the width (thickness) $T_3$ of each of the first protruding portions and the width (thickness) $T_4$ of each of the second protruding portions may be 1/16 or more and 3/5 or less.

Although the first and second protruding portions may each have any shape when viewed from the negative W direction, the shape of each of the first protruding portions when viewed from the negative W direction may be a shape tapered toward the positive D direction as illustrated in FIG. 17B. The shape of each of the second protruding portions when viewed from the negative W direction may be a shape that does not have a corner portion.

In addition, the shape of each of the first protruding portions when viewed from the negative D direction may be a shape tapered toward the negative W direction (a direction toward the upper surface in the usage position) as illustrated in FIG. 16. This is to make it easier for the user's fingers to hold them when accessing from the negative W direction.

Liquid Supply Portion, Electrical Connection Portion

Figure 18:
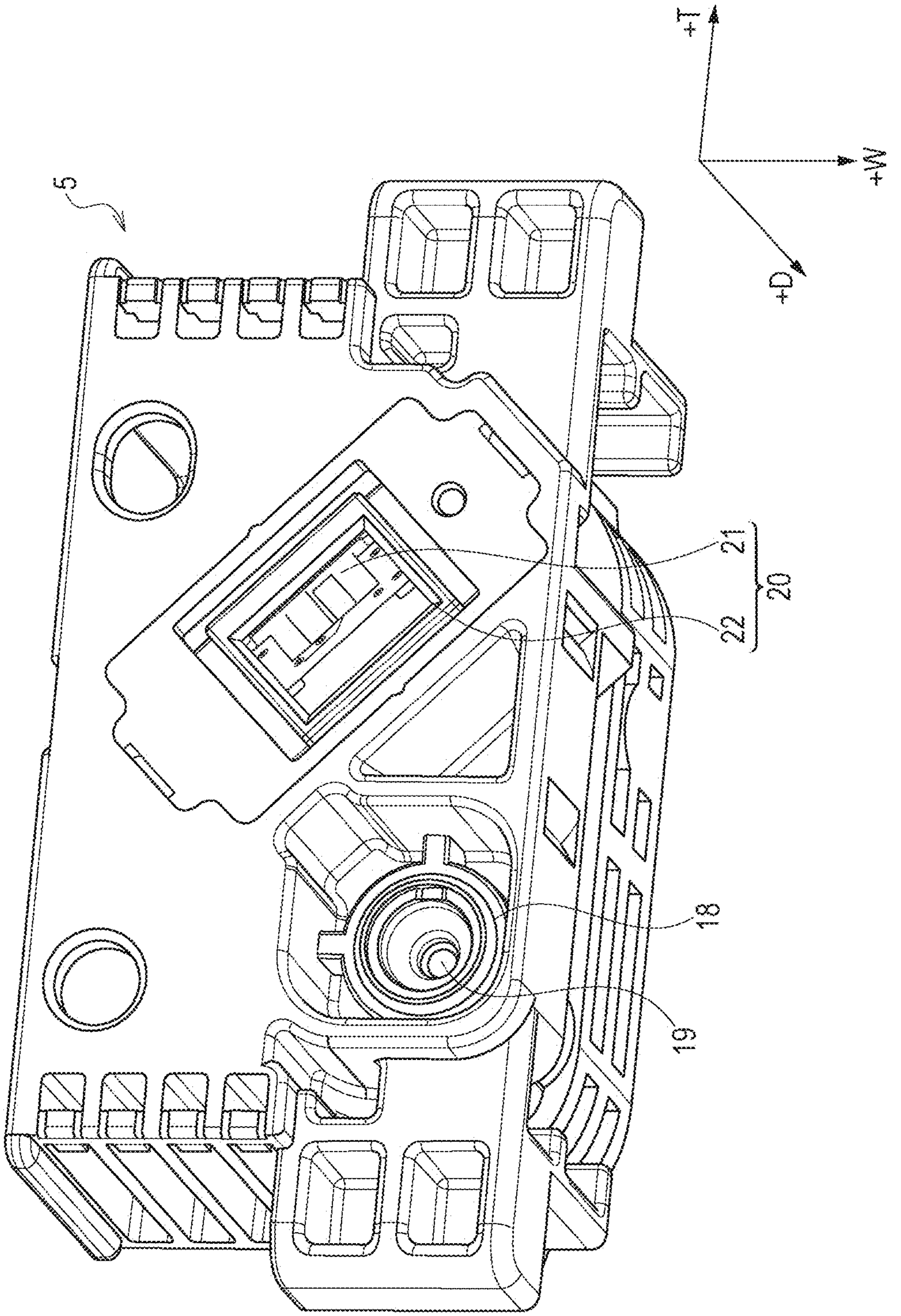
FIG. 18 is a perspective view illustrating a peripheral configuration of an end portion of the ink outlet member in a negative D direction.

As illustrated in FIG. 18, the ink outlet member includes a liquid supply portion (ink supply portion) 18 that is configured to supply a liquid when it is connected to a liquid inlet portion 1005 that is included in an apparatus main body, which will be described later. The liquid supply portion may be provided at an end portion of the ink outlet member in the negative D direction, that is, at an end portion of the ink container in the negative D direction.

The liquid supply portion may have any configuration as long as it has an opening 19 and can supply the liquid as a result of the liquid inlet portion of the apparatus main body being inserted into the opening. Although the opening may have any shape, it may have a circular shape (including an oval shape).

Figure 19:
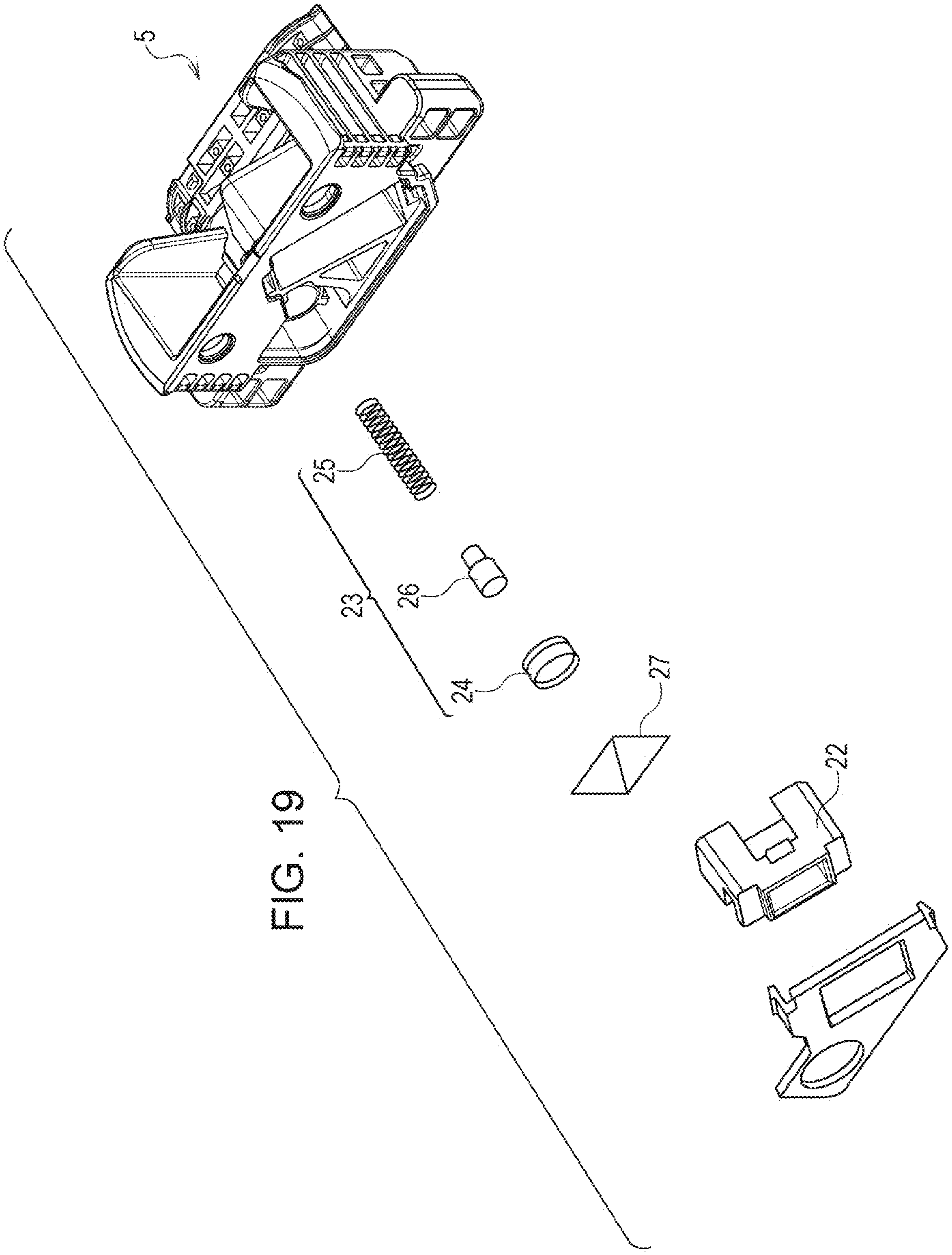
FIG. 19 is an exploded perspective view of the ink outlet member.

In a state where the liquid inlet portion of the apparatus main body is not inserted (i.e., a state before the ink container is used), the liquid supply portion may be provided with a seal portion, a valve portion, or the like in order to prevent the ink from leaking to the outside. The seal portion and the valve portion may have any known structure, and examples thereof include a valve spring structure and a slit valve. FIG. 19 is an exploded perspective view of the ink outlet member, and in the present embodiment, the ink outlet member includes a valve mechanism 23 that is opened and closed in response to the ink outlet member being mounted onto the apparatus main body. More specifically, a valve 26 is pressed against an elastic seal member 24 by using an urging member 25 such as a spring, so that an opening/closing mechanism can be provided.

Alternatively, a mechanism may be employed in which the opening is covered with a film 27 or the like before the user uses it and in which the film becomes torn as a result of the liquid inlet portion of the apparatus main body being inserted into the opening, thereby establishing fluid communication between the apparatus main body and the interior of the ink storage portion. With such a mechanism, leakage of the ink to the outside before use can be effectively suppressed.

Figure 20A:
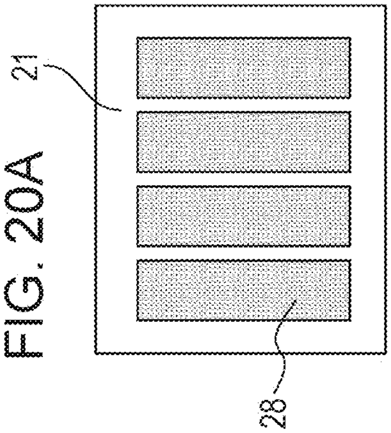
FIGS. 20A to 20F include diagrams illustrating arrangements of pad electrodes.
Figure 20B:
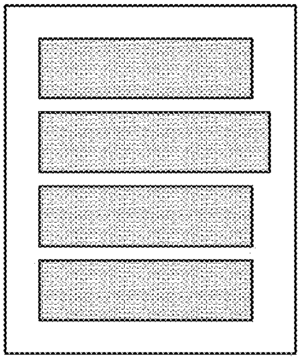
Figure 20C:
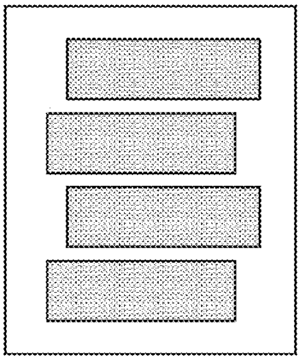
Figure 20D:
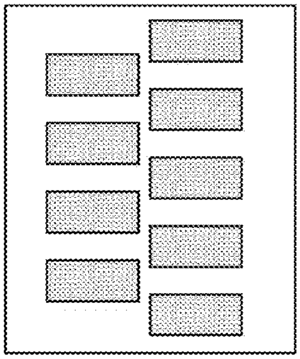
Figure 20E:
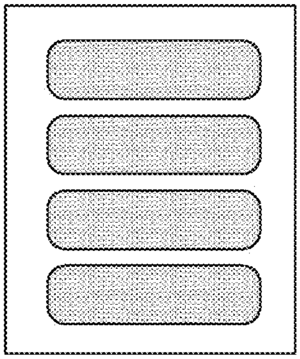
Figure 20F:
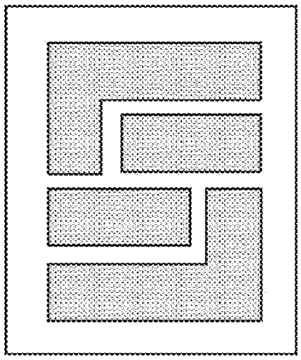

As illustrated in FIG. 18, the ink outlet member includes an electrical connection portion 20 configured to be functionally connectable to an electric contact 1010 that is included in the apparatus main body and that will be described later. More specifically, the electrical connection portion is a memory-device-substrate accommodating portion 22 that accommodates a memory device substrate 21. The memory device substrate is a chip-shaped substrate that has a memory device (memory element) that stores information regarding the color of the ink, information regarding the remaining amount of the ink, and the like. The memory device substrate is provided with a plurality of pad electrodes 28 each of which comes into contact with the electric contact of the apparatus main body so as to be electrically connectable to the electric contact. Note that the pad electrodes and the memory device substrate may be arranged so as to be spaced apart from each other, and in this case, they may be electrically connected to each other by a wiring line or the like. In practice, the electric contact of the apparatus main body is directly connected to the pad electrodes. Thus, the electric contact of the apparatus main body is inserted into the memory-device-substrate accommodating portion and is brought into contact with the pad electrodes to be electrically connected. Although the four pad electrodes are provided in the present embodiment, the number of the pad electrodes is not limited to four, and a necessary number of pad electrodes may be provided. In addition, any known configuration can be employed for the arrangement of the plurality of pad electrodes and the shape of each of the pad electrodes. FIGS. 20A to 20F schematically illustrate examples of the arrangement of the plurality of pad electrodes when the pad electrodes are viewed from a direction perpendicular to the substrate. For example, as illustrated in FIGS. 20B and 20C, the arrangement of the pad electrodes may be bilaterally asymmetric. As illustrated in FIG. 20D, the pad electrodes may be arranged in two rows, such as vertically. As illustrated in FIGS. 20E and 20F, each of the pad electrodes may have a shape other than a rectangular shape. In addition, as illustrated in FIG. 20B and the like, the plurality of pad electrodes may be arranged such that the center of gravity of the pad electrodes as a whole does not coincide with the center of gravity of the memory device substrate.

The electrical connection portion or the memory device substrate and the memory-device-substrate accommodating portion may be provided at the end portion of the ink outlet member in the negative D direction, that is, at the end portion of the ink container in the negative D direction. Although the electrical connection portion or the memory-device-substrate accommodation portion may have any shape, it may have a quadrilateral shape, and in particular, it may have a rectangular shape with long sides and short sides. The memory device substrate may at least be configured to be accommodated in the memory-device-substrate accommodating portion and may have a quadrilateral shape like the electrical connection portion or the memory-device-substrate accommodation portion. The memory device substrate may have a rectangular shape or a square shape.

In this case, the electrical connection portion may be disposed such that, when the electrical connection portion is projected on a plane orthogonal to a mounting direction (negative D direction) of the ink container, a long side of a projected portion of the electrical connection portion crosses the direction of gravity (negative W direction) at an angle of less than 90 degrees while the ink container is in a mounting position by being mounted on the apparatus main body. In addition, the memory-device-substrate accommodating portion may be disposed such that a long side of the memory-device-substrate accommodating portion at an end surface of the ink outlet member, the end surface facing in the negative D direction, crosses the direction of gravity (negative W direction) at an angle of less than 90 degrees while the ink container is in the mounting position by being mounted on the apparatus main body.

In other words, when viewed from the mounting direction (negative D direction) of the ink container, the electrical connection portion or the memory-device-substrate accommodating portion is obliquely arranged (hereinafter also referred to as "oblique arrangement"). In ink containers of the related art, such an oblique arrangement is not employed (hereinafter, such an arrangement of the related art will be also referred to as "horizontal arrangement"), and the projected portion of the electrical connection portion or the long side of the memory-device-substrate accommodating portion does not cross the direction of gravity (negative W direction) or crosses the direction of gravity at 90 degrees in the mounting position. The oblique arrangement makes it less likely for the ink to flow into the electrical connection portion or the memory device substrate even if the ink leaks from the liquid supply portion. In addition, by obliquely arranging the electrical connection portion or the memory-device-substrate accommodating portion, the size of the ink outlet member can be reduced, which is favorable from the standpoint of reducing the amount of plastic. More specifically, in the case of the horizontal arrangement of the related art, the size of the ink outlet member needs to be larger as the size of the memory device substrate used becomes larger. However, by employing the oblique arrangement, it can be disposed while the size of the ink outlet member remains unchanged.

Figure 21A:
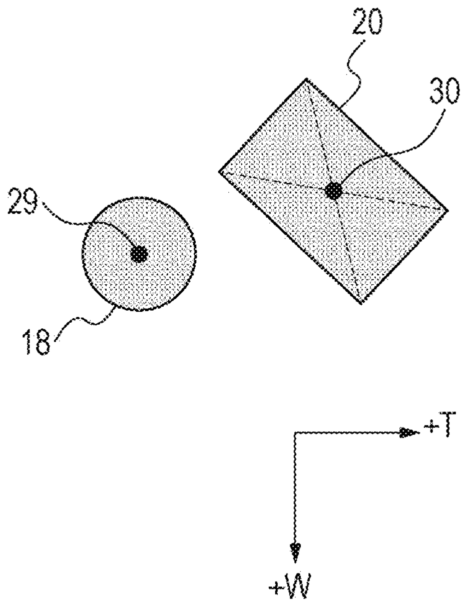
FIGS. 21A and 21B are diagrams illustrating an arrangement of a liquid supply portion and an electrical connection portion.
Figure 21B:
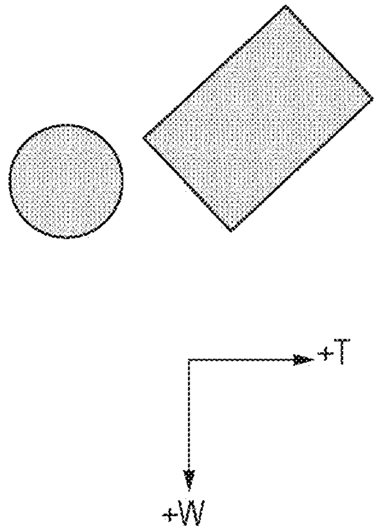

As schematically illustrated in FIGS. 21A and 21B, when viewed from the mounting direction (negative D direction) of the ink container, as a positional relationship in the direction of gravity (negative W direction), the liquid supply portion may be disposed so as to be offset in the positive W direction with respect to the electrical connection portion or with respect to the memory device substrate and the memory-device-substrate accommodating portion. Here, the phrase "be disposed so as to be offset" may refer to a positional relationship in which a center of gravity 29 of the liquid supply portion (the center of a circle in the case where the opening is circular) is located further toward the positive W direction than a center of gravity 30 of the electrical connection portion or the memory-device-substrate accommodation portion (an intersection point of diagonal lines in the case where the memory-device-substrate accommodation portion is rectangular). With such an arrangement relationship, even if the ink leaks from the liquid supply portion, the ink is less likely to flow into the electrical connection portion or the memory device substrate.

In addition, although the electrical connection portion or the memory-device-substrate accommodating portion is obliquely arranged as described above, in the case where the electrical connection portion or the memory-device-substrate accommodating portion is rectangular, there are two possible patterns of the oblique arrangement in relation to the liquid supply portion. The first pattern is an oblique arrangement in which one of the long sides of the electrical connection portion or the memory-device-substrate accommodating portion is closer to the liquid supply portion as illustrated in FIG. 21A. The second pattern is an oblique arrangement in which one of the short sides of the electrical connection portion or the memory-device-substrate accommodating portion is closer to the liquid supply portion as illustrated in FIG. 21B. According to studies conducted by the inventors of the present disclosure, a sufficient effect can be obtained with any of these oblique arrangements. However, the first oblique arrangement may be employed. In other words, the electrical connection portion and the liquid supply portion may be obliquely arranged such that the distance between the long side of the projected portion of the electrical connection portion and the liquid supply portion is shorter than the distance between the short side of the projected portion of the electrical connection portion and the liquid supply portion. This is because, in this case, the lower end of the long side of the electrical connection portion or the memory-device-substrate accommodating portion in the negative W direction is positioned in such a manner as to be spaced apart from the liquid supply portion, and thus, the above-mentioned effect of making it less likely for the ink to flow into the electrical connection portion or the memory device substrate can be obtained at a higher level.

Figure 22A:
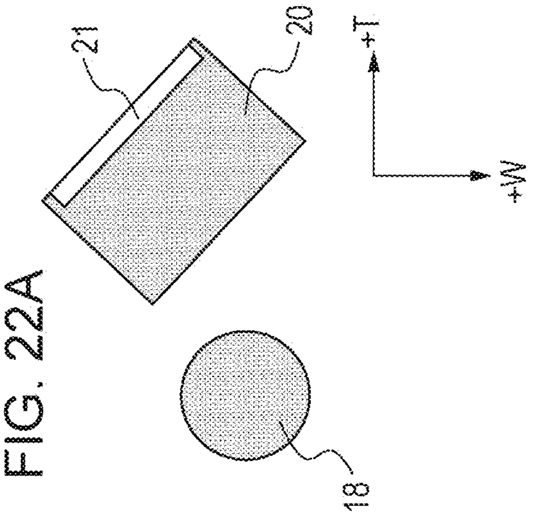
FIGS. 22A to 22F include diagrams illustrating arrangements of a memory device substrate at an inner surface of a memory-device-substrate accommodating portion.
Figure 22B:
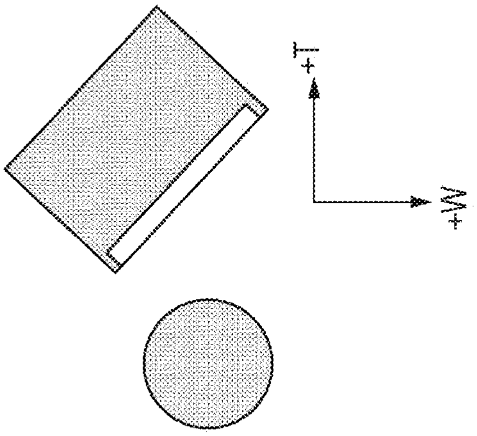
Figure 22C:
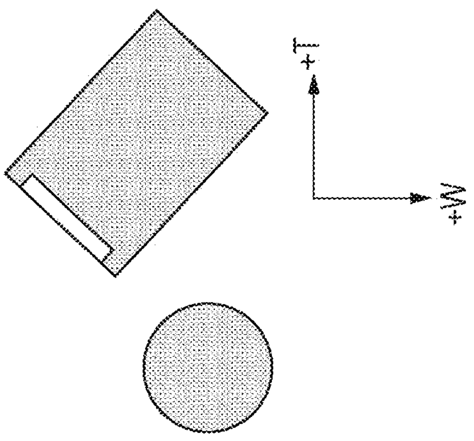
Figure 22D:
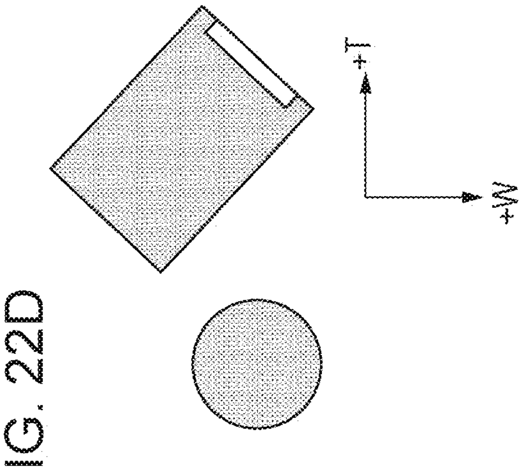
Figure 22E:
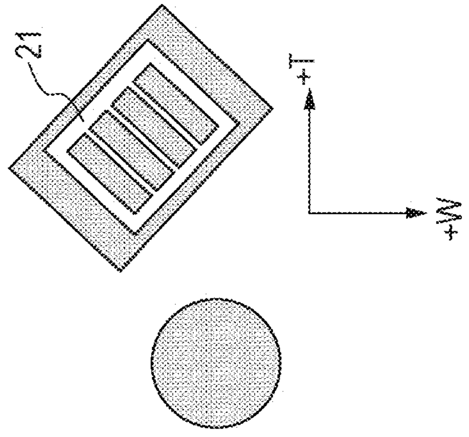

As illustrated in FIG. 19, the memory-device-substrate accommodating portion 22 may have an opening formed at an end portion of the ink outlet member in the negative D direction and may be a space that has a rectangular prism shape (including a cubic shape) extending in the positive D direction (a direction opposite to the mounting direction). The opening at the end portion in the negative D direction is an opening into which the electric contact of the apparatus main body is inserted. The memory device substrate is disposed on an inner surface of the memory-device-substrate accommodating portion, which is the space having a rectangular prism shape. In this case, the space having a rectangular prism shape has five inner surfaces that are the bottom surface facing the opening and four side surfaces surrounding the bottom surface. As illustrated in FIGS. 22A to 22F, the memory device substrate may be disposed on any of these five surfaces. As illustrated in FIGS. 22A to 22D, the memory device substrate may be disposed on any one of the four side surfaces. In particular, as illustrated in FIG. 22A, the memory device substrate may be disposed on the side surface that is farthest from the liquid supply portion 18.

Figure 22F:
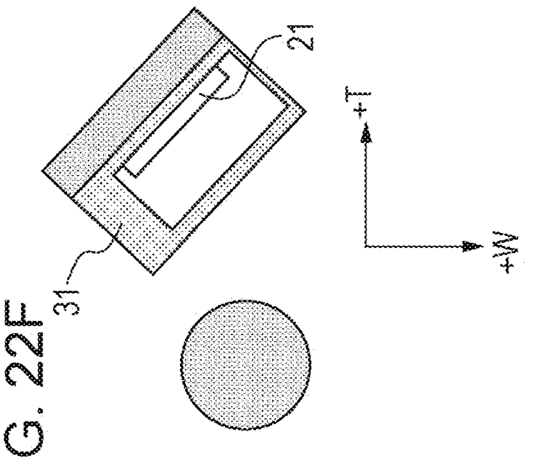

The memory device substrate may be directly bonded to one of the inner surfaces of the memory-device-substrate accommodating portion or may be provided on the inner surface with another member interposed therebetween. An example of the other member may be a memory-device-substrate holder 31 (memory-device-substrate support member) as illustrated in FIG. 22F. In other words, the memory device substrate is provided on the memory-device-substrate holder, and the memory-device-substrate holder is provided on the memory-device-substrate accommodating portion. In this case, the memory-device-substrate holder may be attached so as to be movable in the memory-device-substrate accommodating portion. With such a configuration, when the electric contact (a member provided with the electric contact) of the apparatus main body is inserted into the memory-device-substrate accommodating portion, the memory-device-substrate holder moves along the member of the apparatus main body to an appropriate position, so that the electrical connection between the memory device substrate and the electric contact can be achieved with higher certainty. On the other hand, without such a configuration, depending on how the user inserts it, there is a possibility that the electric contact (member provided with the electric contact) of the apparatus main body may become damaged or the memory device substrate may become scratched. With such a configuration, it also becomes possible to accommodate manufacturing tolerances of components of the apparatus main body, the memory-device-substrate accommodating portion, and the like. In addition, the memory-device-substrate holder may be urged in a specific direction by an elastic member such as a spring. In this case, the direction in which the memory-device-substrate holder is urged may be a direction in which the memory device substrate is pressed against the electric contact of the apparatus main body in a state where the electric contact is inserted.

(II) Recording Apparatus

As described above, the ink container according to the present disclosure is configured to be used by being accommodated in the recording apparatus. The recording apparatus may be a generally used inkjet printer (inkjet recording apparatus), a commercial recording apparatus, or an industrial recording apparatus. In the case where the ink container is an ink pack, the ink capacity thereof can be flexibly adjusted. Using an ink pack with a large ink capacity is beneficial for a commercial or industrial recording apparatus intended for high-volume printing or high-volume recording.

Figure 23:
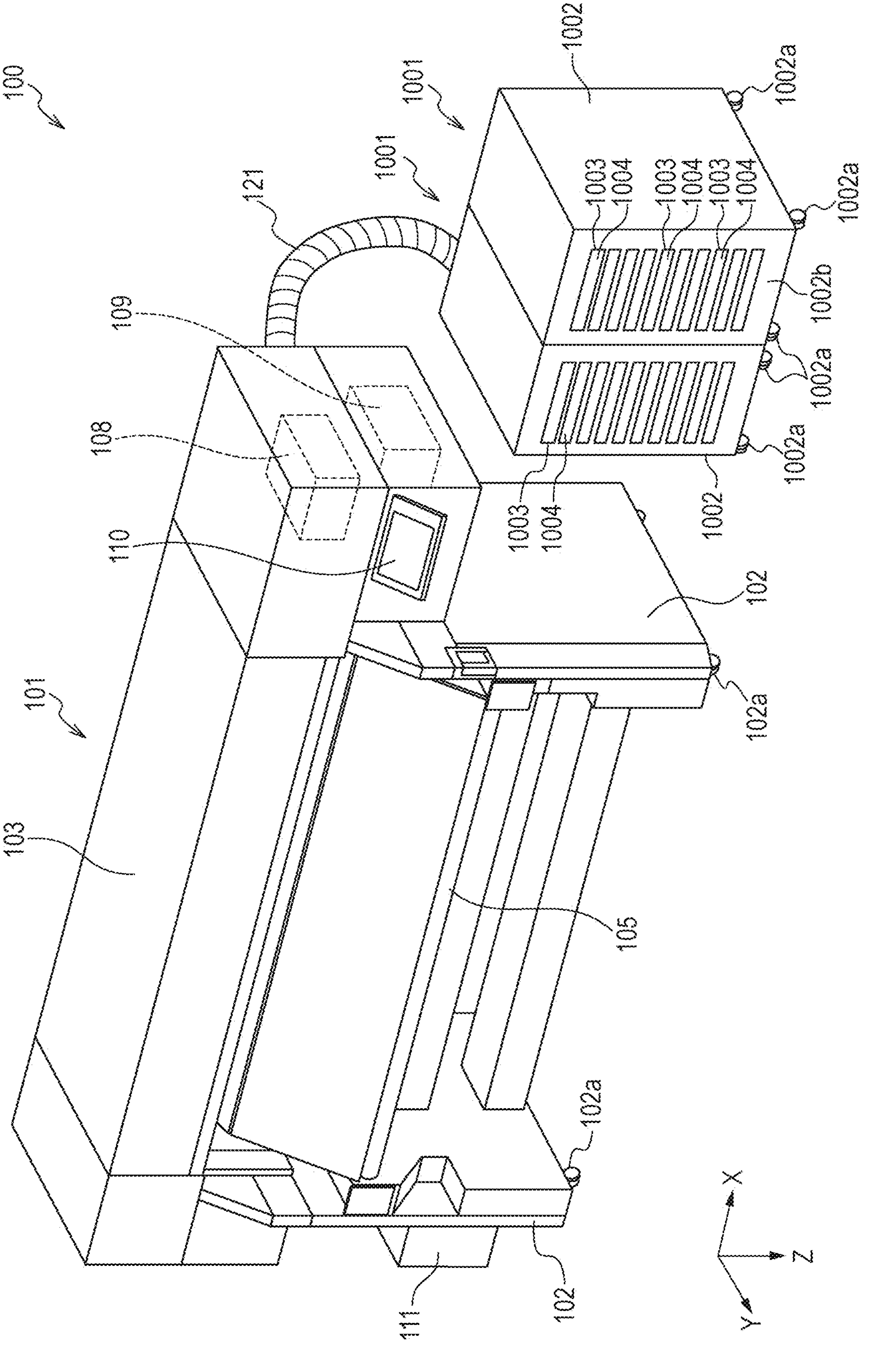
FIG. 23 is a perspective view of a system.
Figure 24A:
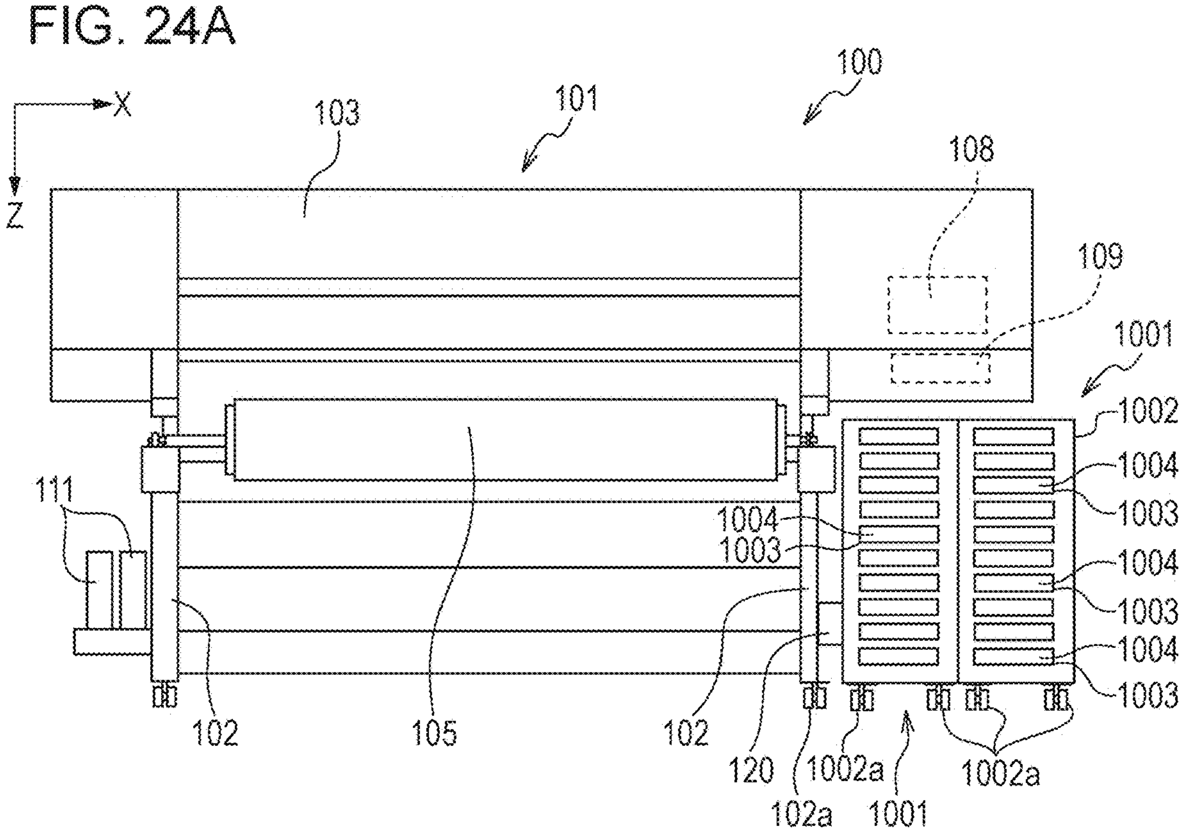
FIGS. 24A and 24B include a front view of the system and a diagram illustrating an internal configuration of the system.

FIG. 23 is a perspective view of a system 100 according to an embodiment of the present disclosure, and FIG. 24A is a front view of the system 100. In FIG. 23 and FIG. 24A, when the system 100 is placed on a horizontal surface, the leftward and rightward directions will be referred to as X directions. The frontward and rearward directions will be referred to as Y directions, and the upward and downward directions will be referred to as Z directions. When the system 100 is viewed from the front, the right-hand side corresponds to the positive X direction. The left-hand side corresponds to the negative X direction. The front side corresponds to the positive Y direction. The rear side corresponds to the negative Y direction. The lower side (lower side in the direction of gravity) corresponds to the positive Z direction. The upper side corresponds to the negative Z direction. Note that the positive X direction corresponds to the above-mentioned negative T direction. The positive Y direction corresponds to the above-mentioned positive D direction. The positive Z direction corresponds to the above-mentioned positive W direction.

The system 100 according to the present embodiment includes liquid supply apparatuses 1001 and a recording apparatus (liquid discharge apparatus) 101 and is a recording system that records an image onto a recording medium, such as a sheet, by discharging ink. In the case of the present embodiment, the two liquid supply apparatuses 1001 are provided in such a manner as to be connected to each other.

The liquid that is supplied from each of the liquid supply apparatuses 1001 to the liquid discharge apparatus 101 is ink, and the liquid discharge apparatus 101 is a recording apparatus that discharges the ink onto a recording medium. However, the present disclosure is not limited to the recording system and can also be applied to various liquid discharge systems intended for discharging a liquid onto a medium.

Note that the term “recording” encompasses not only formation of meaningful information such as characters and figures but also formation of images, designs, patterns, and the like on a recording medium and processing of a medium regardless of whether it is meaningful or meaningless. It does not matter whether information is actualized in a manner perceivable by a human being. In addition, in the present embodiment, although the “recording medium” is assumed to be a sheet-shaped piece of paper, it may be a piece of cloth, a plastic film, or the like.

Liquid Discharge Apparatus

Figure 24B:
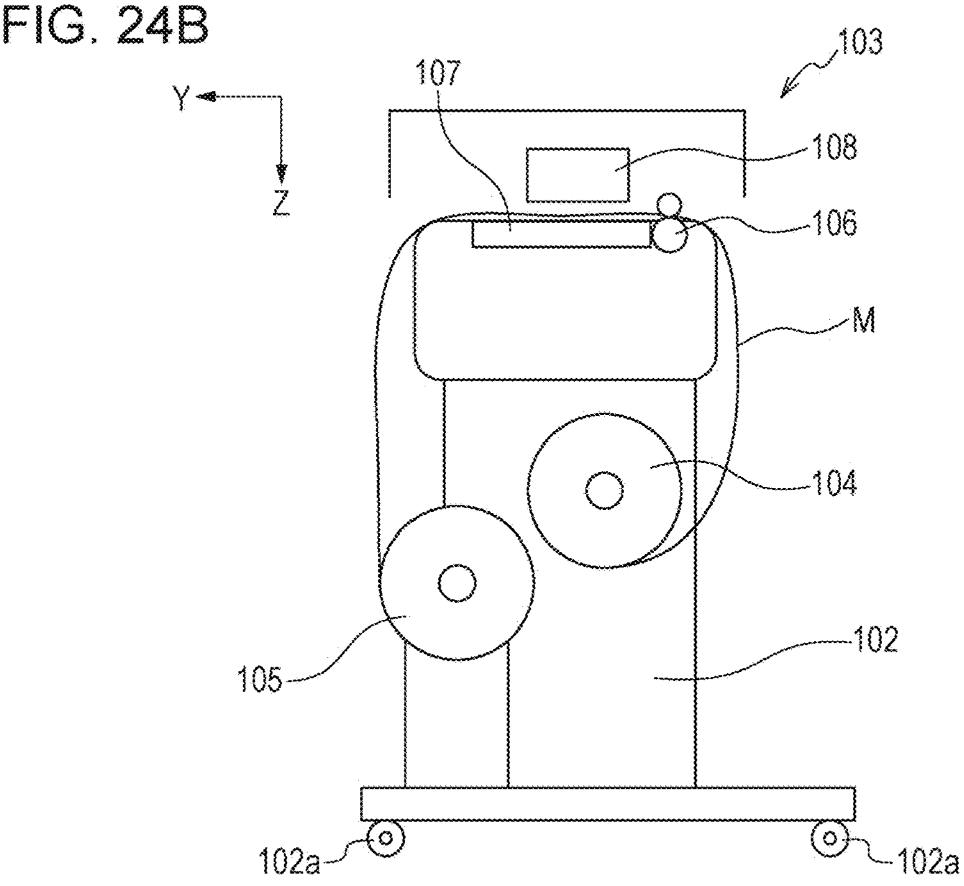

The liquid discharge apparatus 101 will now be described. FIG. 24B is a diagram illustrating an internal configuration of the liquid discharge apparatus 101. In the liquid discharge apparatus 101, a main body 103 is supported by left and right stands 102. Each of the stands 102 is provided with casters 102*a*, so that the liquid discharge apparatus 101 can be relatively easily moved on a floor. A feeding unit 104 and a winding unit 105 are arranged below the main body 103. In the case of the present embodiment, a recording medium M is a roll sheet, and the feeding unit 104 has a shaft around which the recording medium M is wound. The winding unit 105 has a shaft that winds up the recording medium M. In the case of the present embodiment, although the recording medium M is a roll sheet as an example, the recording medium M may be a cut sheet.

The main body 103 includes a conveying unit 106. The conveying unit 106 includes a driving roller and a driven roller, and the recording medium M fed by the feeding unit 104 is nipped at a nip portion defined between these rollers. The recording medium M is conveyed onto a platen 107 as a result of rotation of the driving roller. A discharge head 108 is disposed so as to face the platen 107. The discharge head 108 is a recording head that discharges the ink so as to form an image. The ink is discharged from the discharge head 108 onto the recording medium M, which has been conveyed to the platen 107, so that an image is recorded onto the recording medium M.

The discharge head 108 includes, for example, a discharge energy generating element, such as an electrothermal transducer element (heater) or a piezoelectric element, and discharges the ink from a discharge port. In the case of employing an electrothermal transducer element, the ink is bubbled by heat generated by the electrothermal transducer element, and the ink can be discharged from the discharge port by using the bubbling energy. The recording method of the discharge head 108 may be a serial scan method or a full-line method (page-wide method). In the case of the serial scan method, the discharge head 108 is mounted on a carriage and reciprocates in the X directions. The discharge head 108 discharges the ink while moving in the X directions, and this will be referred to as scanning and recording operations. An image is recorded onto the recording medium M by alternately performing conveying of the recording medium M and the scanning and recording operations with the discharge head 108. In the case of the present embodiment, employment of the serial scan method is assumed. In the case of the full-line method, the discharge head 108 that is elongated in the X directions is used, and an image is recorded while continuously conveying the recording medium M.

The recording medium M on which an image has been recorded is wound up by the winding unit 105. The recording medium M on which the image has been recorded is cut by the user using scissors or the like or is automatically cut by a cutter (not illustrated).

A recovery unit 109 is provided at the main body 103. The recovery unit 109 is disposed outside a recording area (outside a discharge area) of the discharge head 108 and performs processes relating to recovery and maintenance of a discharge performance of the discharge head 108. Examples of such processes include a preliminary discharge or a process of sucking in residual ink or the like from the discharge port of the discharge head 108. When a recovery process is required, the discharge head 108 is moved to a position above the recovery unit 109 as illustrated in FIG. 24A.

In the case of the present embodiment, the stands 102 are arranged at positions slightly outside the width of the recording medium M in the positive and negative X directions in order to support the feeding unit 104 and the winding unit 105, which are heavy, in addition to the main body 103. The main body 103 protrudes in such a manner that a first portion of the main body 103 that includes the recovery unit 109 built therein is located outside one of the stands 102 in the positive X direction. The main body 103 also protrudes in such a manner that a second portion of the main body 103 on the opposite side is located outside the other stand 102 in the negative X direction. A mechanism or the like that causes a carriage (not illustrated) on which the discharge head 108 is mounted to move is built in the second portion of the main body 103.

An operation panel 110 is provided at a front surface of the main body 103. For example, the operation panel 110 is a touch panel and can receive input for various settings relating to recording, display a status of a recording job, and perform other operations.

The liquid discharge apparatus 101 also includes a waste liquid cartridge 111. The waste liquid cartridge 111 is disposed below an end portion of the main body 103 on a side (negative X side) opposite to the side on which the liquid supply apparatuses 1001 are disposed. By positioning the waste liquid cartridge 111 below the portion of the main body 103 that protrudes to the negative X side, the installation area of the liquid discharge apparatus 101 can be reduced.

Waste liquid (waste ink or the like) drawn in by the recovery unit 109 flows into and is collected by the waste liquid cartridge 111. The waste liquid cartridge 111 may be disposed near the recovery unit 109. However, in the case of the present embodiment, the waste liquid cartridge 111 is disposed in an empty space below the end portion of the main body 103, so that the installation area of the liquid discharge apparatus 101 is reduced.

Liquid Supply Apparatus

The liquid supply apparatuses 1001 are each an apparatus that supplies the ink discharged from the discharge head 108 to the liquid discharge apparatus 101. The liquid supply apparatuses each include a box-shaped main body 1002 defining a plurality of slots 1003. The bottom surfaces of the main bodies 1002 are provided with casters 1002*a*, so that the liquid supply apparatuses 1001 can be relatively easily moved on the floor. The plurality of slots 1003 are arranged in the Z directions at the front surfaces of the main bodies 1002. Support units 1004 are inserted into the slots 1003 so as to be attachable to and detachable from the slots 1003 in the Y directions. Each of the support units 1004 supports one of ink containers 200.

Each of the slots 1003 is provided with a tube that connects a corresponding one of the ink containers 200 and the liquid discharge apparatus 101 to each other. The tubes are connected to the liquid discharge apparatus 101 through a single hose 121 that encloses all the tubes. The ink contained in each of the ink containers 200 is supplied to the discharge head 108 via the corresponding tube.

The height of each of the liquid supply apparatuses 1001 is set to be lower than a lower surface of the end portion of the main body 103 of the liquid discharge apparatus 101, the end portion protruding to the positive X side. Thus, as illustrated in FIG. 24A, the liquid supply apparatuses 1001 can be place under the main body 103. The liquid supply apparatuses 1001 can be brought close to a position where they come into contact with one of the stands 102 in the negative X direction. As illustrated in FIG. 24A, the liquid supply apparatuses 1001 can be fixed to the one stand 102 by using a connecting member 120. In the case of moving the system 100, the entire system 100 can be moved integrally as a single unit.

Since the system 100 of the present embodiment includes the two liquid supply apparatuses 1001, a larger number of ink containers 200 can be used. In the case of increasing the number of ink colors for the purpose of higher image quality or in the case of increasing the number of ink colors of the same color for the purpose of higher productivity, it is advantageous to provide a plurality of liquid supply apparatuses 1001 as in the present embodiment. In such a case, as in the present embodiment, the installation area of the system 100 can be reduced by employing a layout in which the liquid supply apparatuses 1001 partially or entirely overlap the liquid discharge apparatus 101 in the X directions. Note that, in the case of the present embodiment, one of the two liquid supply apparatuses 1001 is completely contained within the size of the liquid discharge apparatus 101 in the X directions. Their size relationship is such that, when there are two or more liquid supply apparatuses 1001, they protrude slightly in the positive X direction from the system 100.

Ink Container and Support Unit

Figure 25:
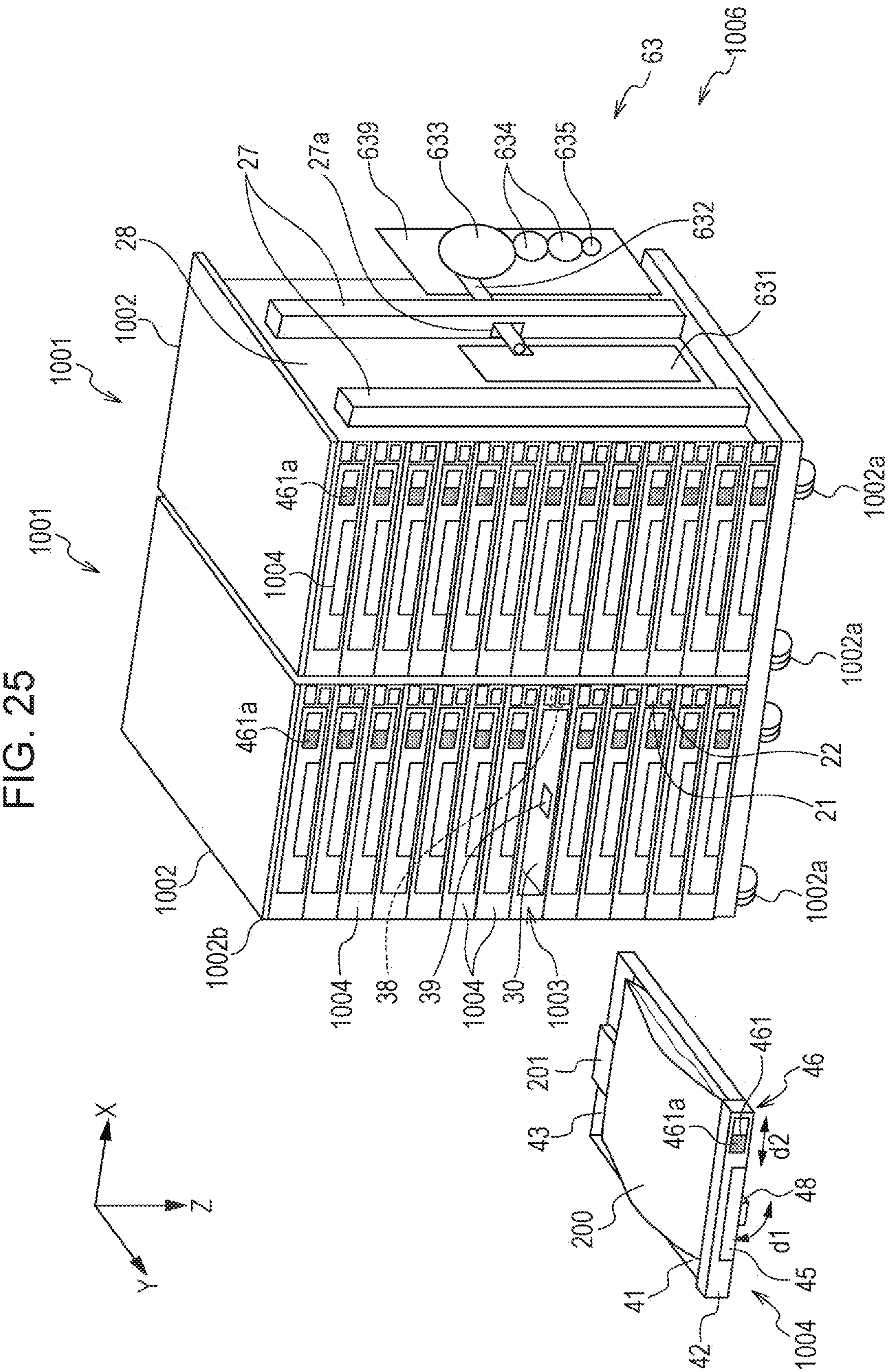
FIG. 25 is a partially exploded perspective view of liquid supply apparatuses.

FIG. 25 is a partially exploded perspective view of the liquid supply apparatuses 1001 and illustrates a state in which one of the support units 1004 is removed from the corresponding slot 1003. FIG. 25 also illustrates a state in which some side walls among the outer walls of the liquid supply apparatuses 1001 are removed to expose an internal mechanism.

Figure 26:
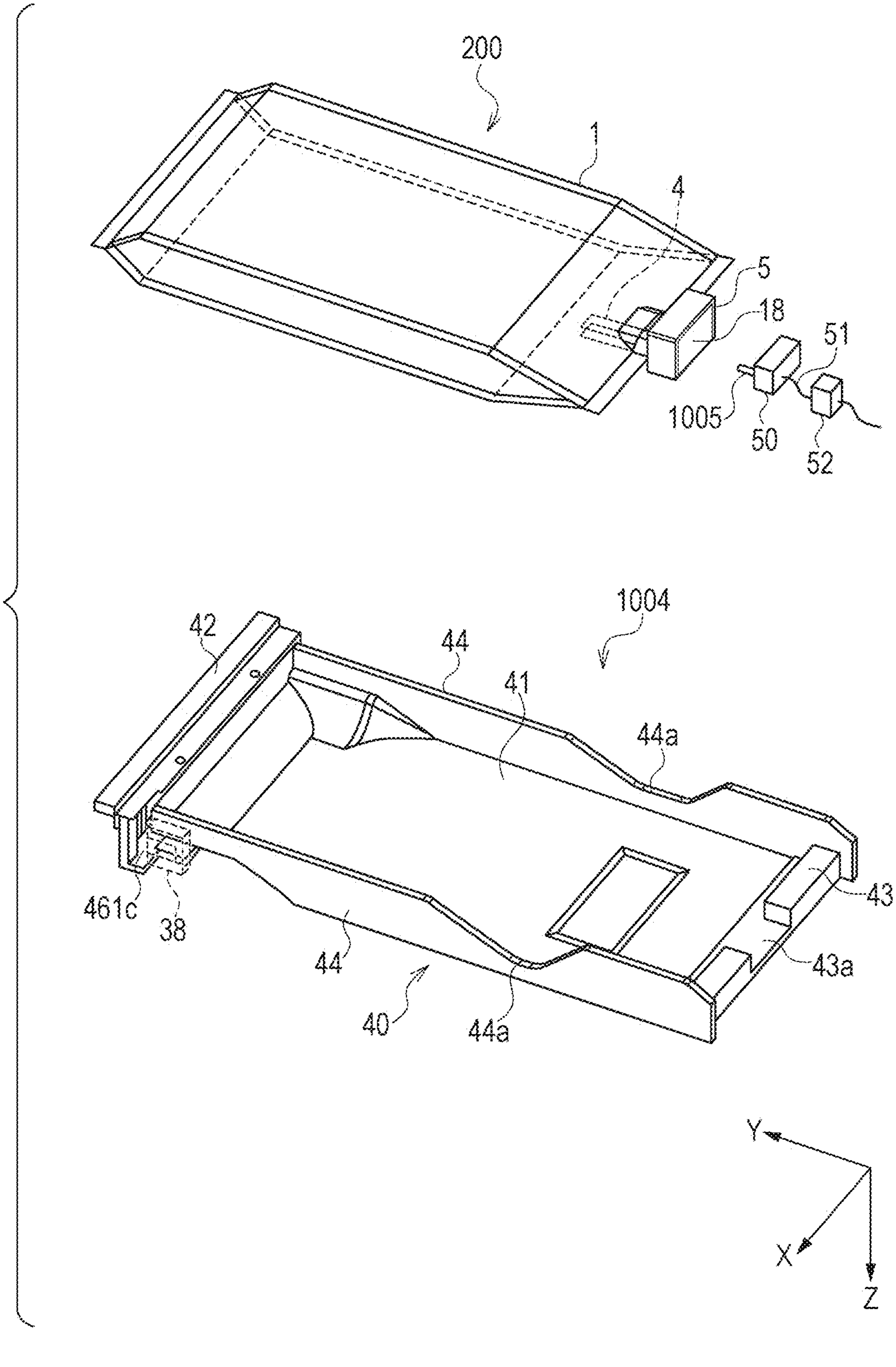
FIG. 26 is a perspective view of the ink container and a support unit.

FIG. 26 is a perspective view of one of the ink containers 200 and the corresponding support unit 1004. As illustrated in FIGS. 28A to 28C and FIGS. 29A to 29D, in the present embodiment, each of the ink containers 200 is placed onto a corresponding one of the support units 1004 (in the order of FIG. 28A, FIG. 28B, and FIG. 28C), and the support unit 1004 with the ink container 200 placed thereon is installed into a corresponding one of the slots 1003 (in the order of FIG. 29A, FIG. 29B, FIG. 29C, and FIG. 29D), so that the ink container 200 is accommodated in a corresponding one of the liquid supply apparatuses 1001. Then, as described above, the ink is supplied from the liquid supply apparatuses 1001 to the liquid discharge apparatus 101, so that an image can be recorded. The method of supplying the ink from the ink container to the liquid discharge apparatus is not limited to that described in the present embodiment, and for example, a system in which the ink container is directly mounted on the liquid discharge apparatus without using a support unit or the like may be employed.

Figure 27:
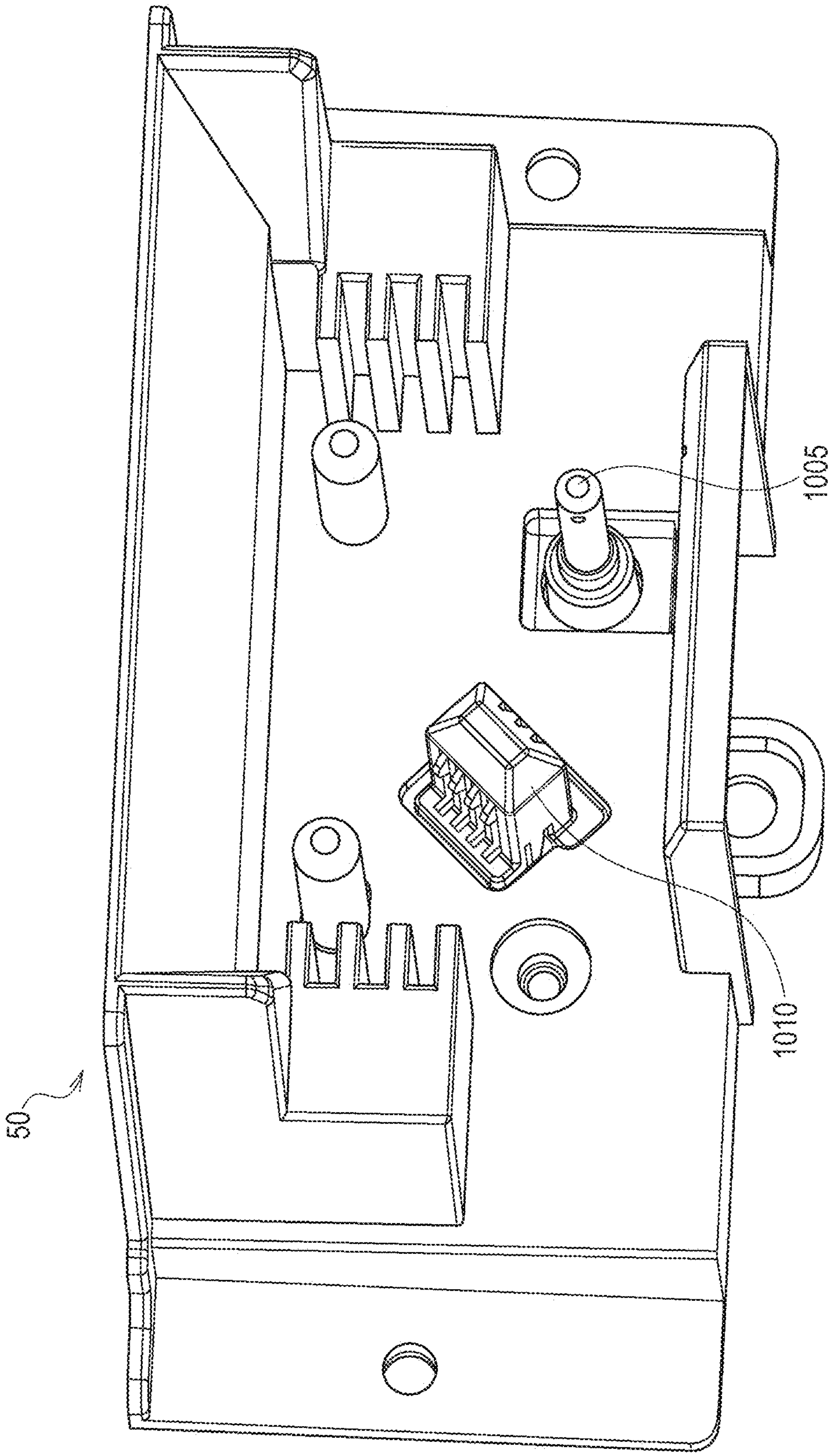
FIG. 27 is an enlarged perspective view of a support member.

In each of the slots 1003 of the main bodies 1002 is provided with the needle-type liquid inlet portion 1005 that is inserted into the liquid supply portion 18 of a corresponding one of the ink containers 200 and the electric contact 1010 that is configured to be connectable by being inserted into the electrical connection portion 20 of the corresponding ink container 200. The needle-type liquid inlet portion 1005 and the electric contact 1010 are provided on the rear side of the slot 1003. FIG. 27 is a diagram illustrating a portion of a support member 50 where the liquid inlet portion 1005 and the electric contact 1010 are arranged. When the liquid inlet portion 1005 is inserted into the liquid supply portion 18 to be in a connected state, the valve mechanism 23 is brought into an open state as a result of the insertion of the liquid inlet portion 1005. The liquid inlet portion 1005 is supported by the support member 50 having a block shape and connected to a tube 51. The liquid inlet portion 1005 forms a flow path through which the liquid stored in the ink storage portion 1 flows out to the liquid discharge apparatus 101, which is a supply destination, and the liquid flowing out to the liquid inlet portion 1005 is supplied to the liquid discharge apparatus 101 via the tube 51. An electric flow-path valve 52 is provided at an intermediate portion of the tube 51. Opening and closing of the flow-path valve 52 enables blocking and unblocking of the tube 51. The liquid supply portion 18 may be provided with a pump, a pressure control mechanism, or the like in order to supply the ink contained in the ink container 200 toward the discharge head 108 via the tube 51.

Each of the support units 1004 includes a support portion 40 that supports a corresponding one of the ink containers 200, and when seen as a whole, the support unit 1004 is in the form of a tray onto which the ink container 200 that is in a horizontal position is placed. Each of the support units 1004 is displaceable substantially in the Y directions between a retracted position where the corresponding ink container 200 is accommodated in a corresponding one of the main bodies 1002 and a removal position where the ink container 200 is exposed to the outside of the main body 1002. In FIG. 25, one of the support units 1004 is located at the removal position, and the other support units 1004 are located at the retracted position. Each of the ink containers 200 can be replaced at the removal position, and the liquid contained in each of the ink containers 200 can be supplied to the liquid discharge apparatus 101 at the retracted position. In the present embodiment, each of the support units 1004 is separated from the slot 1003 at the removal position. However, the removal position may be a position at which an end portion of the support unit 1004 is held in the corresponding slot 1003 and may at least be a position where replacement of each of the ink containers 200 can be performed with respect to the corresponding support unit 1004. In addition, each of the slots 1003 may be provided with a plurality of pairs of linear guide rails formed of one or two or more protruding shapes or recessed shapes extending in the Y directions in order to guide the movement of the corresponding support unit 1004. FIGS. 29A to 29D are diagrams illustrating the state of one of the support units 1004 with the corresponding ink container 200 placed thereon moving from the removal position to the retracted position along the guide rails provided inside the corresponding slot 1003.

Figure 28C:
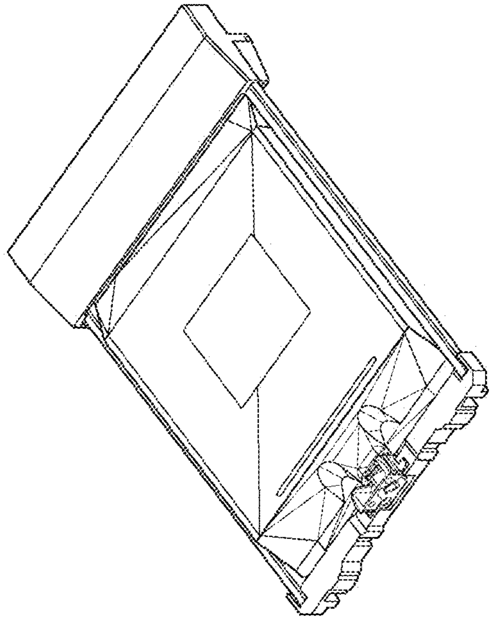
FIGS. 28A to 28C include diagrams illustrating a way of placing the ink container onto the supporting unit.
Figure 28B:
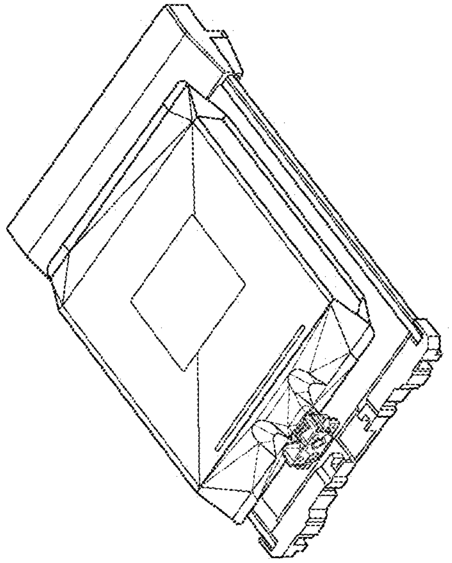
Figure 28A:
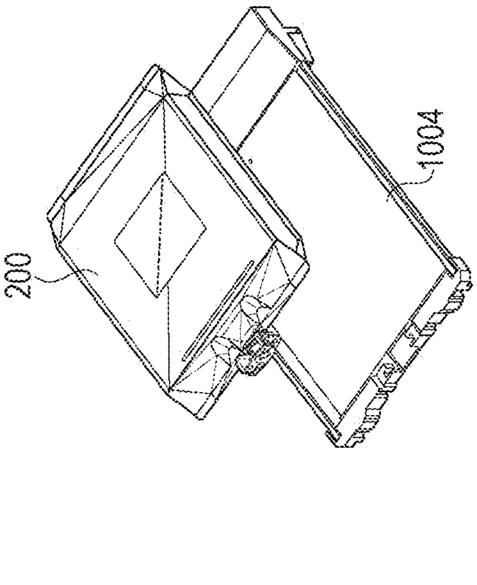
Figure 29B:
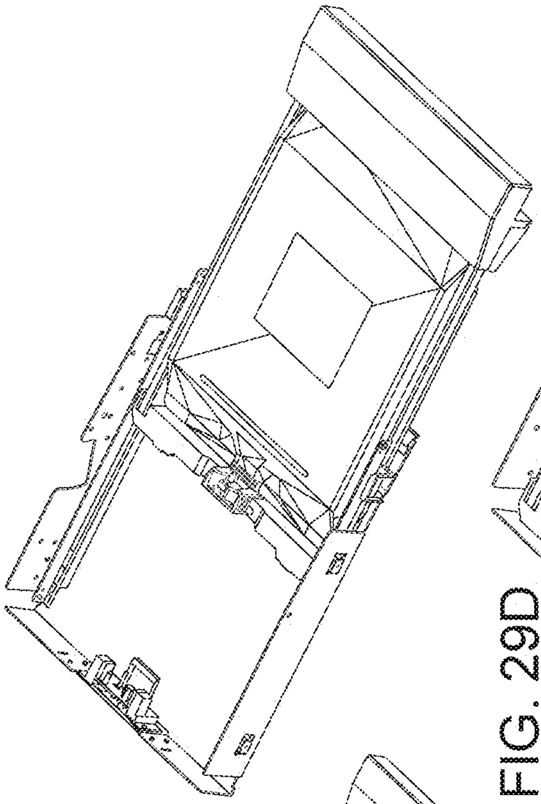
FIGS. 29A to 29D include diagrams illustrating a way of installing the support unit with the ink container placed thereon into a slot.
Figure 29D:
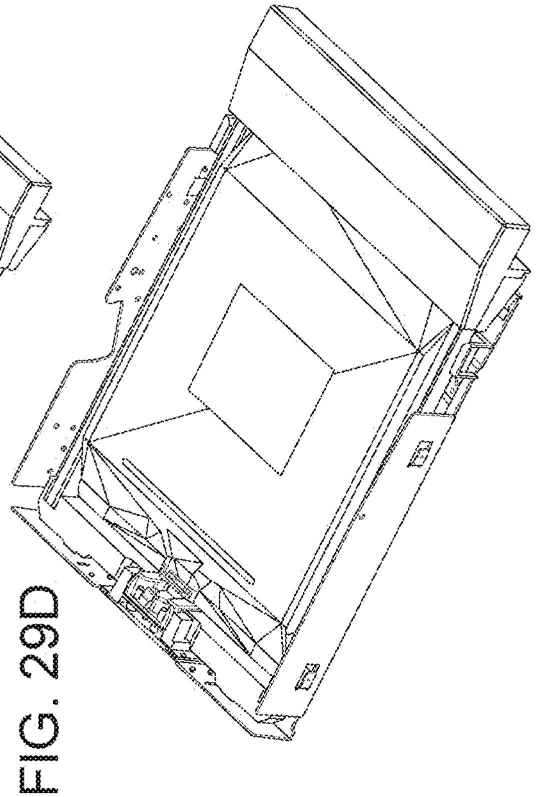
Figure 29A:
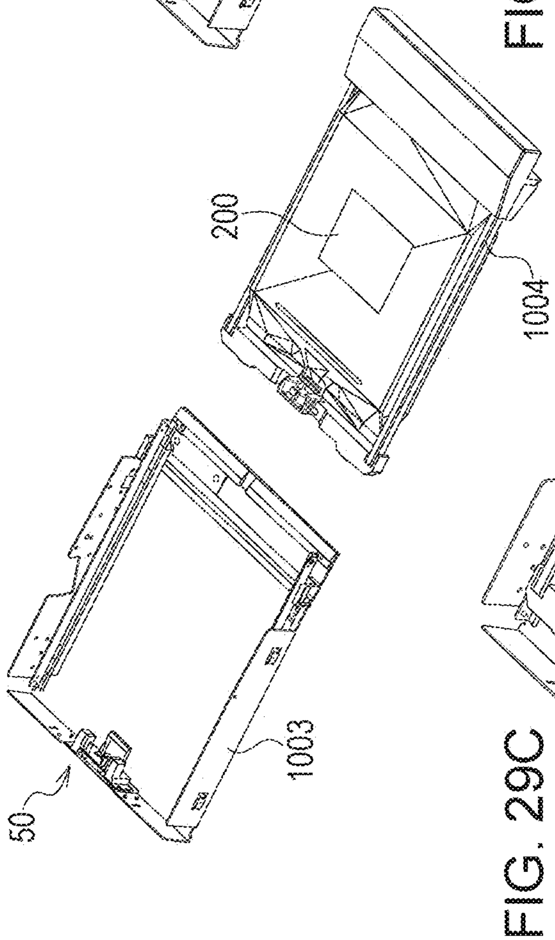
Figure 29C:
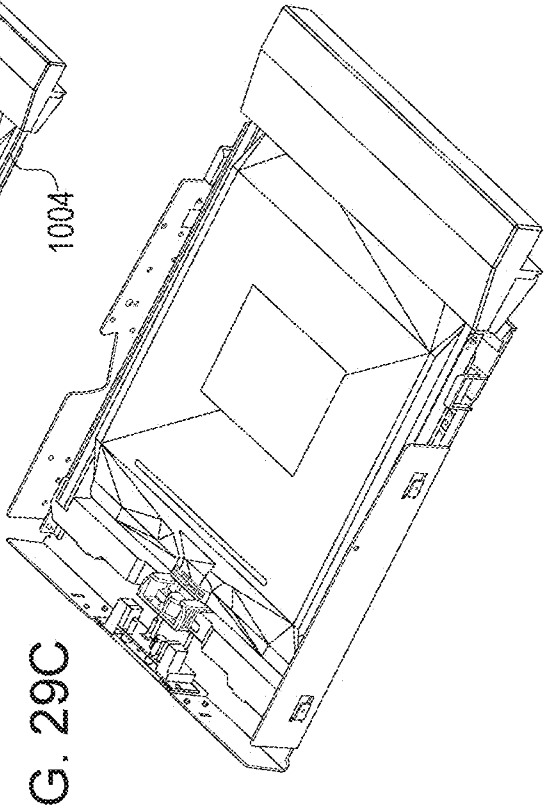

In each of the support units 1004, the support portion 40 has a placement surface 41 onto which the corresponding ink container 200 is placed, and the four sides of the placement surface 41 are defined by left and right side plates 44, a front end portion 42, and a rear end portion 43. A notch portion 44*a* is formed in each of the side plates 44. The rear end portion 43 has a recess 43*a* in which an exit member 201 is disposed. The support portion 40 may include a positioning member configured to be engageable with a positioning portion that is included in the ink outlet member 5 of the ink container 200. More specifically, it has a recessed shape capable of engaging with the second protruding portions of the ink supply member of the ink container, which have been described above. FIGS. 28A and 28B are diagrams illustrating the second protruding portions of the ink outlet member 5 engaging with a recessed portion of the support portion 40.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-128241 filed Aug. 7, 2023, which is hereby incorporated by reference herein in its entirety.

What is claimed is:

1. An ink container comprising:

an ink storage portion that has flexibility and that is configured to store ink in an interior thereof, the ink storage portion including:

(1) a first surface, (2) a second surface that is opposite to the first surface and that has first and second sides shared with the first surface, (3) a first gusset surface connecting the first surface and the second surface to each other, and (4) a second gusset surface that is opposite to the first gusset surface and that connects the first surface and the second surface to each other; and an ink supply portion that is provided at the first side of the ink storage portion and that is configured to supply the ink stored in the ink storage portion to outside, wherein a ridge portion is provided at the first surface of the ink storage portion so as to cross an imaginary line obtained by extending a central axis of the ink supply portion, wherein, when a distance from a first end portion of the ink supply portion, the first end portion facing the interior of the ink storage portion, to an intersection point of the ridge portion and the imaginary line is denoted by $D_1$ [mm] and a thickness of the first end portion of the ink supply portion is denoted by $T_1$ [mm], a ratio $D_1/T_1$ is 5/8 or more and 40/8 or less, wherein the first gusset surface and the second gusset surface each include a folded portion that is provided so as to be folded toward the interior of the ink storage portion, and wherein a shortest distance from each one of two end portions of the ridge portion to an apex of the folded portion of the first gusset surface or the second gusset surface closer to the one of the two ends is 25 mm or less.

2. The ink container according to claim 1, wherein a height of the ridge portion is 0.5 mm or more and 4.0 mm or less.

3. The ink container according to claim 1, wherein a length of the ridge portion is 80 mm or more.

4. The ink container according to claim 1, wherein a width of the ridge portion is 2 mm or more and 8 mm or less.

5. The ink container according to claim 1, wherein a cross-sectional shape of the ridge portion is a semi-elliptical shape.

6. The ink container according to claim 1, wherein the ridge portion is provided parallel to the first side.

7. The ink container according to claim 1, wherein, when a distance from the first side of the ink storage portion to the first end portion of the ink supply portion is denoted by $T_2$ [mm] and a distance from the first side to the second side is denoted by $T_3$, a ratio $T_2/T_3$ is 1/10 or more and 3/10 or less.

8. A recording apparatus comprising:

an apparatus main body; and an ink container that is configured to be attachable to and detachable from the apparatus main body, wherein the ink container includes an ink storage portion that has flexibility and that is configured to store ink in an interior thereof, the ink storage portion including:

(1) a first surface, (2) a second surface that is opposite to the first surface and that has first and second sides shared with the first surface, (3) a first gusset surface connecting the first surface and the second surface to each other, and (4) a second gusset surface that is opposite to the first gusset surface and that connects the first surface and the second surface to each other, and an ink supply portion that is provided at the first side of the ink storage portion and that is configured to supply the ink stored in the ink storage portion to outside, wherein a ridge portion is provided at the first surface of the ink storage portion so as to cross an imaginary line obtained by extending a central axis of the ink supply portion, wherein, when a distance from a first end portion of the ink supply portion, the first end portion facing the interior of the ink storage portion, to an intersection point of the ridge portion and the imaginary line is denoted by $D_1$ [mm] and a thickness of the first end portion of the ink supply portion is denoted by $T_1$ [mm], a ratio $D_1/T_1$ is 5/8 or more and 40/8 or less, wherein the first gusset surface and the second gusset surface each include a folded portion that is provided so as to be folded toward the interior of the ink storage portion, and wherein a shortest distance from each one of two end portions of the ridge portion to an apex of the folded portion of the first gusset surface or the second gusset surface closer to the one of the two ends is 25 mm or less.

* * * * *